(12) United States Patent
Makino et al.

(10) Patent No.: US 7,745,718 B2
(45) Date of Patent: *Jun. 29, 2010

(54) MUSIC-PIECE CLASSIFYING APPARATUS AND METHOD, AND RELATED COMPUTER PROGRAM

(75) Inventors: Masaaki Makino, Kanagawa-ken (JP); Ichiro Shishido, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/453,214

(22) Filed: May 1, 2009

(65) Prior Publication Data
US 2009/0217806 A1 Sep. 3, 2009

(51) Int. Cl.
*G10H 1/00* (2006.01)
*G10H 1/18* (2006.01)

(52) U.S. Cl. .................. 84/615; 84/616; 84/618; 84/653; 84/654; 84/656

(58) Field of Classification Search .................. None
See application file for complete search history.

(56) References Cited

U.S. PATENT DOCUMENTS

| | | | | |
|---|---|---|---|---|
| 6,938,209 | B2 * | 8/2005 | Ogawa et al. | 715/727 |
| 7,075,000 | B2 * | 7/2006 | Gang et al. | 84/600 |
| 7,544,881 | B2 * | 6/2009 | Makino et al. | 84/615 |
| 2003/0089218 | A1 * | 5/2003 | Gang et al. | 84/615 |
| 2005/0071332 | A1 * | 3/2005 | Ortega et al. | 707/4 |
| 2007/0106406 | A1 * | 5/2007 | Makino et al. | 700/94 |
| 2008/0040123 | A1 * | 2/2008 | Shishido | 704/503 |
| 2008/0066611 | A1 * | 3/2008 | Makino | 84/609 |
| 2009/0132077 | A1 * | 5/2009 | Fujihara et al. | 700/94 |

FOREIGN PATENT DOCUMENTS

| | | |
|---|---|---|
| JP | 06-290574 | 10/1994 |
| JP | 2002-278547 | 9/2002 |
| JP | 2004-326840 | 11/2004 |

\* cited by examiner

*Primary Examiner*—Marlon T Fletcher
(74) *Attorney, Agent, or Firm*—Louis Woo

(57) ABSTRACT

A bibliographic-information impression word is generated from a bibliographic information segment about selected one of music pieces. An acoustic feature quantity of an audio signal representing the selected music piece is calculated. A feature-quantity impression word is generated from the calculated acoustic feature quantity. A degree of conformity between the bibliographic-information impression word and the feature-quantity impression word is determined. Both the bibliographic-information impression word and the feature-quantity impression word are selected as final impression words when the determined conformity degree is greater than a predetermined threshold value. One is selected from the bibliographic-information impression word and the feature-quantity impression word as a final impression word when the determined conformity degree is not greater than the predetermined threshold value. A signal representing the final impression word or words is stored into a storage in relation to the selected music piece.

3 Claims, 23 Drawing Sheets

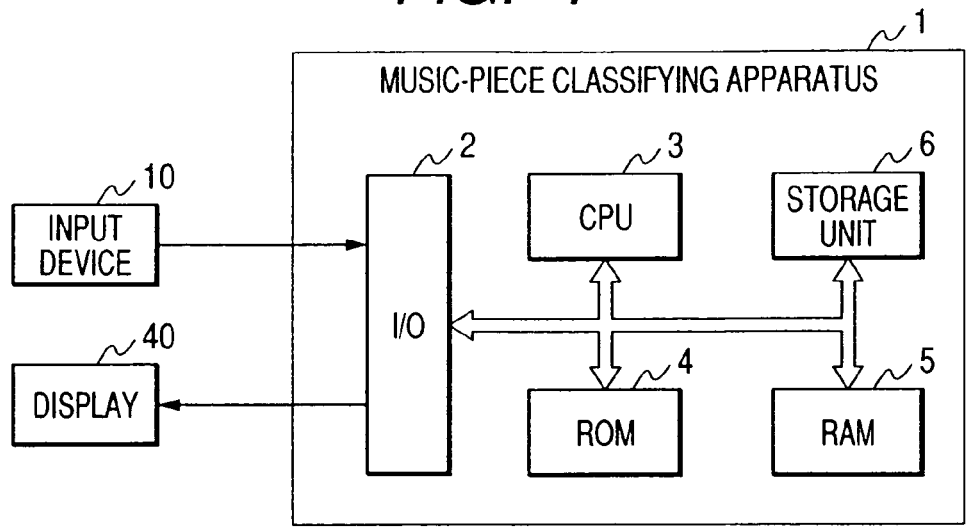
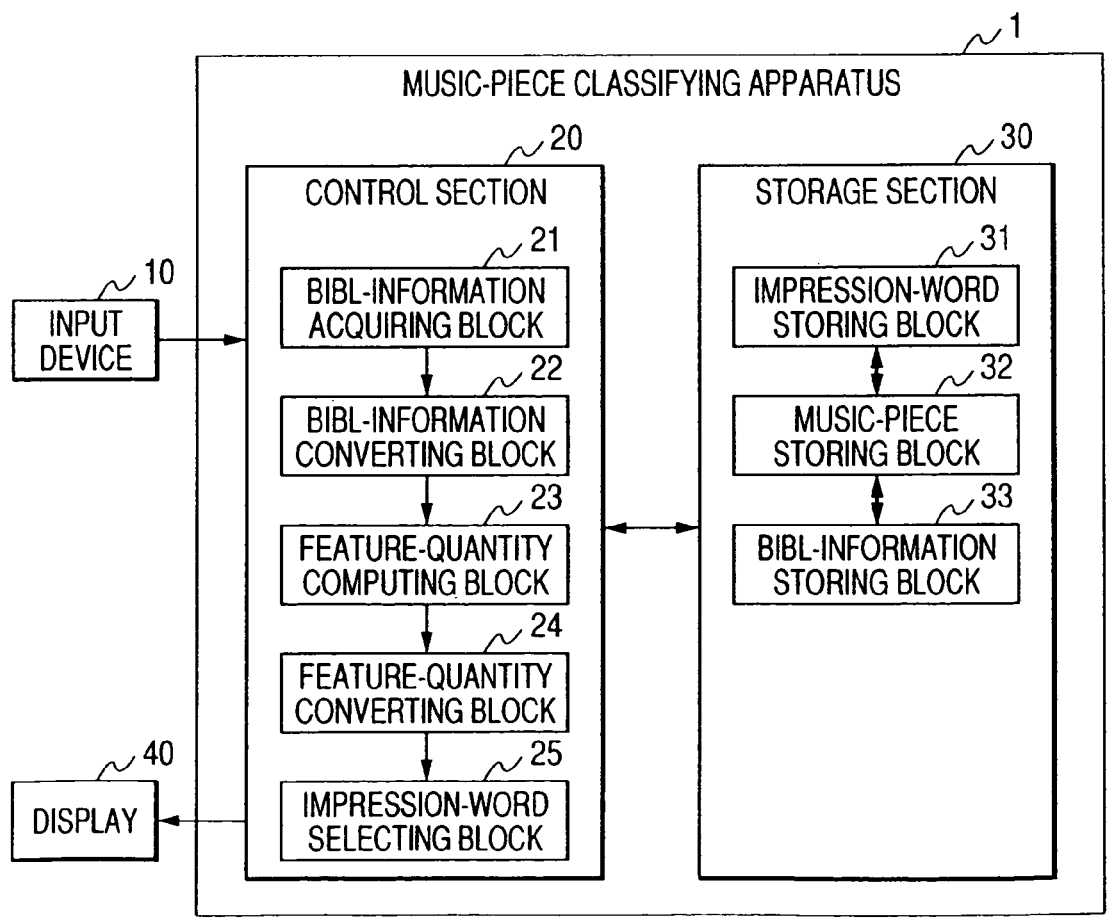

FIG. 3

| CONTENT ID | TITLE | ARTIST | GENRE | YEAR | ... |
|---|---|---|---|---|---|
| ID1 | ABCDE | ○ | JAZZ | 1999 | ... |
| ID2 | EFG | × | THRASH METAL | 2001 | ... |
| ID3 | LMN | △ | NEW AGE | 1996 | ... |
| ... | ... | ... | ... | ... | ... |

FIG. 4

| INPUT WORD IN TITLE | BIBLIOGRAPHIC-INFORMATION IMPRESSION WORD (OUTPUT WORD) |
|---|---|
| NOCTURNE | GENTLE |
| PASTORALE | SIMPLE |
| ... | ... |

FIG. 5

| GENRE (INPUT WORD) | BIBLIOGRAPHIC-INFORMATION IMPRESSION WORD (OUTPUT WORD) |
|---|---|
| EASY LISTENING | MILD |
| HOUSE | UPBEAT, SOPHISTICATED |
| NEW AGE | GENTLE |
| ROCK | |
| INDUSTRIAL | HEAVY |
| POEM READING | OTHER |
| ... | ... |

FIG. 6

| ARTIST (INPUT WORD) | BIBLIOGRAPHIC-INFORMATION IMPRESSION WORD (OUTPUT WORD) |
|---|---|
| A | FORCEFUL |
| B | GENTLE |
| C | X MILD |
| ... | ... |

| CONTENT ID | TITLE | ARTIST | GENRE | YEAR |
|---|---|---|---|---|
| IDn | PASTORALE | AAA | EASY LISTENING | 1999 |

| CONVERSION-RESULT IMPRESSION WORD |
|---|
| SIMPLE | MILD | MILD |

USED IMPRESSION WORD : MILD, SIMPLE

| CONTENT ID | TITLE | ARTIST | GENRE | YEAR |
|---|---|---|---|---|
| IDm | POWERFUL | ABC | SOUL | 1975 |

| CONVERSION-RESULT IMPRESSION WORD |
|---|
| FORCEFUL / X FORCEFUL / PASSIONATE / X HEAVY |

USED IMPRESSION WORD : PASSIONATE

FIG. 9

| CONTENT ID | FEATURE QUANTITY 1 | FEATURE QUANTITY 2 | ... | FEATURE QUANTITY N |
|---|---|---|---|---|
| ID1 | 0.012003 | 0.129869 | ... | 0.220436 |
| ID2 | 0.03178 | 0.117536 | ... | 0.174924 |
| ... | ... | ... | ... | ... |

FIG. 12

| IMPRESSION WORD COMBINATION | | CONFORMITY DEGREE |
|---|---|---|
| FORCEFUL | GENTLE | 0.05 |
| FORCEFUL | CHEERFUL | 0.85 |
| FORCEFUL | UPBEAT | 0.9 |
| ... | ... | ... |

FIG. 13

| BIBLIOGRAPHIC-INFORMATION IMPRESSION WORD | FEATURE-QUANTITY IMPRESSION WORD | CONFORMITY DEGREE | CONFORMITY DEGREE THRESHOLD VALUE |
|---|---|---|---|
| FORCEFUL | GENTLE (PROBABILITY: 0.48) | 0.05 | 0.5 |

FIG. 14

| PROBABILITY OF GENTLE | PROBABILITY THRESHOLD VALUE | ADOPTED IMPRESSION WORD |
|---|---|---|
| 0.48 | 0.4 | GENTLE |
|  | 0.5 | FORCEFUL |

FIG. 15

| CONTENT ID | IMPRESSION WORD |
|---|---|
| ID1 | FORCEFUL |
| ID2 | MILD, SIMPLE |
| ID3 | UPBEAT, SOPHISTICATED |
| ... | ... |

FIG. 16

| | TITLE | | | | ARTIST |
|---|---|---|---|---|---|
| 1. | ○ | ○ | ○ | ○ | A |
| 2. | ○ | ○ | × | × | B |
| 3. | △ | △ | △ | △ | C |
| 4. | ○ | ○ | ○ | ○ | D |
| 5. | ● | ○ | ○ | ○ | E |
| | | | | | ... |

| FORCEFUL | UPBEAT | MILD | GENTLE | ... |

FIG. 19

| INPUT WORD IN TITLE | BIBLIOGRAPHIC-INFORMATION IMPRESSION WORD (OUTPUT WORD) | CONFIDENCE |
|---|---|---|
| NOCTURNE | GENTLE | 0.75 |
| PASTORALE | SIMPLE | 0.82 |
| ⋮ | ⋮ | ⋮ |

FIG. 20

| GENRE (INPUT WORD) | BIBLIOGRAPHIC-INFORMATION IMPRESSION WORD (OUTPUT WORD) | CONFIDENCE |
|---|---|---|
| EASY LISTENING | MILD | 0.9 |
| HOUSE | UPBEAT, SOPHISTICATED | 0.95, 0.6 |
| NEW AGE | GENTLE | 0.7 |
| ROCK | FORCEFUL | 0.2 |
| INDUSTRIAL | HEAVY | 0.87 |
| ⋮ | ⋮ | ⋮ |

FIG. 21

| ARTIST (INPUT WORD) | BIBLIOGRAPHIC-INFORMATION IMPRESSION WORD (OUTPUT WORD) | CONFIDENCE |
|---|---|---|
| A | FORCEFUL | 0.6 |
| B | GENTLE | 0.8 |
| C | X MILD | -0.3 |
| ⋮ | ⋮ | ⋮ |

FIG. 22

| YEAR (INPUT WORD) | BIBLIOGRAPHIC-INFORMATION IMPRESSION WORD (OUTPUT WORD) | CONFIDENCE |
|---|---|---|
| ~1960 | SIMPLE | 0.8 |
| ~1980 | HEAVY | -0.5 |
| 2000~ | SOPHISTICATED | 0.1 |
| ⋮ | ⋮ | ⋮ |

FIG. 23

| IMPRESSION WORD | TITLE | ARTIST | GENTLE | YEAR | CONFIDENCE TOTAL |
|---|---|---|---|---|---|
| | DANCE 1 | BBB | PUNK | 2001 | |
| UPBEAT | 0.6 | | 0.3 | | 0.9 |
| FORCEFUL | | 0.1 | 0.8 | | 0.9 |
| GENTLE | | -0.3 | | | -0.3 |
| MILD | | | | | 0 |
| ... | ... | ... | ... | ... | ... |

FIG. 24

| IMPRESSION WORD | PROBABILITY |
|---|---|
| FORCEFUL | 0.122 |
| MILD | 0.049 |
| UPBEAT | 0.697 |
| ⋮ | ⋮ |

FIG. 25

| IMPRESSION WORD | FORCEFUL | MILD | GENTLE | UPBEAT | ... |
|---|---|---|---|---|---|
| FIRST IMPRESSION VECTOR | 0.7 | 0 | 0 | 0.2 | ... |

FIG. 26

| IMPRESSION WORD | FORCEFUL | MILD | GENTLE | UPBEAT | ... |
|---|---|---|---|---|---|
| SECOND IMPRESSION VECTOR | 0.24 | 0.04 | 0.01 | 0.56 | ... |

FIG. 27

| IMPRESSION WORD | CONFORMITY DEGREE | BOTH ADOPTED |
|---|---|---|
| FORCEFUL | 0.9 | YES |
| UPBEAT | | |

FIG. 29

| IMPRESSION WORD | FIRST IMPRESSION VECTOR | SECOND IMPRESSION VECTOR | COMBINATION IMPRESSION VECTOR |
|---|---|---|---|
| FORCEFUL | 0.2 | 0.22 | 0.42 |
| MILD | 0.6 | 0.3 | 0.9 |
| UPBEAT | 0.2 | 0.25 | 0.45 |
| SIMPLE | -0.3 | 0.1 | -0.2 |
| ... | ... | ... | ... |

FIG. 30

CONFORMITY-DEGREE THRESHOLD VALUE: 0.5

| IMPRESSION WORD | IMPRESSION WORD | CONFORMITY DEGREE | ABOVE THRESHOLD VALUE |
|---|---|---|---|
| FORCEFUL | MILD | 0.1 | NO |
| UPBEAT | FORCEFUL | 0.9 | YES |
| MILD | UPBEAT | 0.6 | YES |

FIG. 31

| IMPRESSION WORD | COMBINATION VALUE | ADOPTED |
|---|---|---|
| FORCEFUL | 0.42 | NO |
| MILD | 0.9 | YES |
| UPBEAT | 0.45 | YES |

MUSIC-PIECE CLASSIFYING APPARATUS AND METHOD, AND RELATED COMPUTER PROGRAM

BACKGROUND OF THE INVENTION

1. Field of the Invention

This invention relates to a method and an apparatus for classifying music pieces represented by data stored in, for example, a recording medium, a server, or a storage unit. This invention also relates to a computer program for classifying music pieces.

2. Description of the Related Art

Japanese patent application publication number 2002-278547 discloses a system composed of a music-piece registering section, a music-piece database, and a music-piece retrieving section. The music-piece registering section registers audio signals representing respective music pieces and ancillary information pieces relating to the respective music pieces in the music-piece database. Each audio signal representing a music piece and an ancillary information piece relating thereto are in a combination within the music-piece database. Each ancillary information piece has an ID, a bibliographic information piece, acoustic feature values (acoustic feature quantities), and impression values about a corresponding music piece. The bibliographic information piece represents the title of the music piece and the name of a singer or a singer group vocalizing in the music piece.

The music-piece registering section in the system of Japanese application 2002-278547 analyzes each audio signal to detect the values (the quantities) of acoustic features of the audio signal. The detected acoustic feature values are registered in the music-piece database. The music-piece registering section converts the detected acoustic feature values into values of a subjective impression about a music piece represented by the audio signal. The impression values are registered in the music-piece database.

The music-piece retrieving section in the system of Japanese application 2002-278547 responds to user's request for retrieving a desired music piece. The music-piece retrieving section computes impression values of the desired music piece from subjective-impression-related portions of the user's request. Bibliographic-information-related portions are extracted from the user's request. The computed impression values and the extracted bibliographic-information-related portions of the user's request are combined to form a retrieval key. The music-piece retrieving section searches the music-piece database in response to the retrieval key for ancillary information pieces similar to the retrieval key. Music pieces corresponding to the found ancillary information pieces (the search-result ancillary information pieces) are candidate ones. The music-piece retrieving section selects one from the candidate music pieces according to user's selection or a predetermined selection rule. The search for ancillary information pieces similar to the retrieval key has the following steps. Matching is implemented between the extracted bibliographic-information-related portions of the user's request and the bibliographic information pieces in the music-piece database. Similarity between the computed impression values and the impression values in the music-piece database are calculated. From the ancillary information pieces in the music-piece database, ones are selected on the basis of the matching result and the calculated similarities.

In the system of Japanese application 2002-278547, the registered impression values tend to be out of harmony with human sensations since they are derived from the acoustic features of the audio signals. The system of Japanese application 2002-278547 tend to be inoperative for audio signals representative of readings of poems and stories.

Japanese patent application publication number 2004-326840 discloses a music data selection system including a data analyzer. For every music data block representing one music piece, the data analyzer subjects lyrics in the music data block to a morphological analysis to convert them into feature quantities concerning impression words. Specifically, the data analyzer extracts impression words from the lyrics in the music data block. According to a thesaurus dictionary, the data analyzer separates the extracted impression words into thesaurus groups of synonyms. For each thesaurus group, the data analyzer computes a frequency at which related synonyms appear. The computed appearance frequency is a feature quantity. Thus, for every music data block representing one music piece, the data analyzer obtains impression words and appearance frequencies (feature quantities) of the obtained impression words.

The system of Japanese application 2004-326840 includes a data deciding portion which responds to a keyword set by a user. For selected ones among music data blocks representing respective music pieces, the data deciding portion calculates the value of a correlation between the keyword and each of impression words obtained by the data analyzer. For each of the selected music data blocks, the data deciding portion computes a score from the calculated values of correlations between the keyword and the impression words, and the appearance frequencies of the impression words. The data deciding portion makes a play list in which the selected music data blocks are arranged in the order of computed score.

The system of Japanese application 2004-326840 is ineffective for music data blocks representing music pieces without words.

Japanese patent application publication number 6-290574/1994 discloses a music-piece retrieval apparatus in which a primary index of each music piece is a bibliographic item about the music piece such as a title thereof. Acoustic features such as a rhythm-related feature and a chord-related feature are derived from audio data representing each music piece. The derived acoustic features are labeled a secondary index of the music piece. A tertiary index of each music piece is generated on the basis of the secondary index thereof. The tertiary index represents subjective and emotional features of the music piece. There are storages which store primary, secondary, and tertiary indexes of many music pieces. To implement retrieval, a user inputs conditions of a desired music piece which are designed to correspond to primary, secondary, and tertiary indexes of the desired music piece. The inputted conditions are compared with the stored primary, secondary, and tertiary indexes of the music pieces. The comparison is to find, among the stored primary, secondary, and tertiary indexes of the music pieces, a set of primary, secondary, and tertiary indexes of at least one music piece which matches the inputted conditions. The music piece corresponding to the found set of primary, secondary, and tertiary indexes is selected as a retrieval result regarding the desired music piece.

In the music-piece retrieval apparatus of Japanese application 6-290574/1994, the derivatives of the acoustic powers of audio data representing each music piece are computed for each prescribed time interval (each frame). The autocorrelation of the power derivatives is calculated. The calculated autocorrelation varies as a function of a frequency parameter or a period parameter. A value of the frequency parameter or the period parameter is decided at which the calculated autocorrelation is maximized. One of the derived acoustic features is generated on the basis of the decided value of the frequency parameter or the period parameter.

SUMMARY OF THE INVENTION

It is a first object of this invention to provide a reliable apparatus for classifying music pieces represented by data stored in, for example, a recording medium, a server, or a storage unit.

It is a second object of this invention to provide a reliable method of classifying music pieces.

It is a third object of this invention to provide a reliable computer program for classifying music pieces.

A first aspect of this invention provides a music-piece classifying apparatus comprising first means for storing audio signals representing music pieces respectively; second means for storing bibliographic information segments about the respective music pieces represented by the audio signals stored in the first means; third means for reading out, from the second means, a bibliographic information segment about selected one of the music pieces; fourth means for generating a bibliographic-information impression word on the basis of the bibliographic information segment read out by the third means; fifth means for reading out, from the first means, an audio signal representing the selected one of the music pieces; sixth means for calculating an acoustic feature quantity of the audio signal read out by the fifth means; seventh means for, generating a feature-quantity impression word on the basis of the acoustic feature quantity calculated by the sixth means; eighth means for determining a degree of conformity between the bibliographic-information impression word generated by the fourth means and the feature-quantity impression word generated by the seventh means; ninth means for deciding whether or not the conformity degree determined by the eighth means is greater than a predetermined threshold value; tenth means for selecting both the bibliographic-information impression word generated by the fourth means and the feature-quantity impression word generated by the seventh means as final impression words when the ninth means decides that the conformity degree determined by the eighth means is greater than the predetermined threshold value; and eleventh means for storing a signal representing the final impression words selected by the tenth means in relation to the selected one of the music pieces.

A second aspect of this invention provides a music-piece classifying apparatus comprising first means for storing audio signals representing music pieces respectively; second means for storing bibliographic information segments about the respective music pieces represented by the audio signals stored in the first means; third means for reading out, from the second means, a bibliographic information segment about selected one of the music pieces; fourth means for generating, on the basis of the bibliographic information segment read out by the third means, a first impression vector of elements being confidences corresponding to respective bibliographic-information impression words; fifth means for reading out, from the first means, an audio signal representing the selected one of the music pieces; sixth means for calculating an acoustic feature quantity of the audio signal read out by the fifth means; seventh means for generating, on the basis of the acoustic feature quantity calculated by the sixth means, a second impression vector of elements being probabilities corresponding to respective feature-quantity impression words; eighth means for selecting, from the elements in the first impression vector and the elements in the second impression vector, ones greater than a predetermined reference value; ninth means for selecting, from the bibliographic-information impression words and the feature-quantity impression words, ones corresponding to the elements selected by the eighth means as final impression words; and tenth means for storing a signal representing the final impression words selected by the ninth means in relation to the selected one of the music pieces.

A third aspect of this invention provides a music-piece classifying apparatus comprising first means for storing audio signals representing music pieces respectively; second means for storing bibliographic information segments about the respective music pieces represented by the audio signals stored in the first means; third means for reading out, from the second means, a bibliographic information segment about selected one of the music pieces; fourth means for generating, on the basis of the bibliographic information segment read out by the third means, a first impression vector of elements being confidences corresponding to respective bibliographic-information impression words; fifth means for reading out, from the first means, an audio signal representing the selected one of the music pieces; sixth means for calculating an acoustic feature quantity of the audio signal read out by the fifth means; seventh means for generating, on the basis of the acoustic feature quantity calculated by the sixth means, a second impression vector of elements being probabilities corresponding to respective feature-quantity impression words; eighth means for selecting a prescribed number of successive greatest ones from the elements in the first impression vector and the elements in the second impression vector; ninth means for selecting, from the bibliographic-information impression words and the feature-quantity impression words, ones corresponding to the elements selected by the eighth means as final impression words; and tenth means for storing a signal representing the final impression words selected by the ninth means in relation to the selected one of the music pieces.

A fourth aspect of this invention provides a music-piece classifying apparatus comprising first means for storing audio signals representing music pieces respectively; second means for storing bibliographic information segments about the respective music pieces represented by the audio signals stored in the first means; third means for reading out, from the second means, a bibliographic information segment about selected one of the music pieces; fourth means for generating, on the basis of the bibliographic information segment read out by the third means, a first impression vector of elements being confidences corresponding to respective basic impression words; fifth means for reading out, from the first means, an audio signal representing the selected one of the music pieces; sixth means for calculating an acoustic feature quantity of the audio signal read out by the fifth means; seventh means for generating, on the basis of the acoustic feature quantity calculated by the sixth means, a second impression vector of elements being probabilities corresponding to the respective basic impression words; eighth means for adding the elements in the first impression vector and the elements in the second impression vector to generate combination values corresponding to the respective basic impression words, and for generating a third impression vector of elements being the generated combination values corresponding to the respective basic impression words; ninth means for selecting, from the elements in the third impression vector, ones greater than a predetermined reference value; tenth means for selecting, from the basic impression words, ones corresponding to the elements selected by the ninth means as final impression words; and eleventh means for storing a signal representing the final impression words selected by the tenth means in relation to the selected one of the music pieces.

A fifth aspect of this invention provides a music-piece classifying apparatus comprising first means for storing audio signals representing music pieces respectively; second means for storing bibliographic information segments about the respective music pieces represented by the audio signals stored in the first means; third means for reading out, from the second means, a bibliographic information segment about selected one of the music pieces; fourth means for generating, on the basis of the bibliographic information segment read out by the third means, a first impression vector of elements being confidences corresponding to respective basic impression words; fifth means for reading out, from the first means, an audio signal representing the selected one of the music pieces; sixth means for calculating an acoustic feature quantity of the audio signal read out by the fifth means; seventh means for generating, on the basis of the acoustic feature quantity calculated by the sixth means, a second impression vector of elements being probabilities corresponding to the respective basic impression words; eighth means for adding the elements in the first impression vector and the elements in the second impression vector to generate combination values corresponding to the respective basic impression words, and for generating a third impression vector of elements being the generated combination values corresponding to the respective basic impression words; ninth means for selecting a prescribed number of successive greatest ones from the elements in the third impression vector; tenth means for selecting, from the basic impression words, ones corresponding to the elements selected by the ninth means as final impression words; and eleventh means for storing a signal representing the final impression words selected by the tenth means in relation to the selected one of the music pieces.

A sixth aspect of this invention provides a computer program for music-piece classification which comprises the steps of reading out, from a storage, a bibliographic information segment about selected one of music pieces; generating a bibliographic-information impression word on the basis of the read-out bibliographic information segment; reading out, from the storage, an audio signal representing the selected one of the music pieces; calculating an acoustic feature quantity of the read-out audio signal; generating a feature-quantity impression word on the basis of the calculated acoustic feature quantity; determining a degree of conformity between the generated bibliographic-information impression word and the generated feature-quantity impression word; deciding whether or not the determined conformity degree is greater than a predetermined threshold value; selecting both the generated bibliographic-information impression word and the generated feature-quantity impression word as final impression words when it is decided that the determined conformity degree is greater than the predetermined threshold value; and storing a signal representing the final impression words into the storage in relation to the selected one of the music pieces.

A seventh aspect of this invention provides a computer program for music-piece classification which comprises the steps of reading out, from a storage, a bibliographic information segment about selected one of music pieces; generating, on the basis of the read-out bibliographic information segment, a first impression vector of elements being confidences corresponding to respective bibliographic-information impression words; reading out, from the storage, an audio signal representing the selected one of the music pieces; calculating an acoustic feature quantity of the read-out audio signal; generating, on the basis of the calculated acoustic feature quantity, a second impression vector of elements being probabilities corresponding to respective feature-quantity impression words; selecting, from the elements in the first impression vector and the elements in the second impression vector, ones greater than a predetermined reference value; selecting, from the bibliographic-information impression words and the feature-quantity impression words, ones corresponding to the selected elements as final impression words; and storing a signal representing the final impression words into the storage in relation to the selected one of the music pieces.

An eighth aspect of this invention provides a computer program for music-piece classification which comprises the steps of reading out, from a storage, a bibliographic information segment about selected one of music pieces; generating, on the basis of the read-out bibliographic information segment, a first impression vector of elements being confidences corresponding to respective bibliographic-information impression words; reading out, from the storage, an audio signal representing the selected one of the music pieces; calculating an acoustic feature quantity of the read-out audio signal; generating, on the basis of the calculated acoustic feature quantity, a second impression vector of elements being probabilities corresponding to respective feature-quantity impression words; selecting a prescribed number of successive greatest ones from the elements in the first impression vector and the elements in the second impression vector; selecting, from the bibliographic-information impression words and the feature-quantity impression words, ones corresponding to the selected elements as final impression words; and storing a signal representing the final impression words into the storage in relation to the selected one of the music pieces.

A ninth aspect of this invention provides a computer program for music-piece classification which comprises the steps of reading out, from a storage, a bibliographic information segment about selected one of music pieces; generating, on the basis of the read-out bibliographic information segment, a first impression vector of elements being confidences corresponding to respective basic impression words; reading out, from the storage, an audio signal representing the selected one of the music pieces; calculating an acoustic feature quantity of the read-out audio signal; generating, on the basis of the calculated acoustic feature quantity, a second impression vector of elements being probabilities corresponding to the respective basic impression words; adding the elements in the first impression vector and the elements in the second impression vector to generate combination values corresponding to the respective basic impression words, and generating a third impression vector of elements being the generated combination values corresponding to the respective basic impression words; selecting, from the elements in the third impression vector, ones greater than a predetermined reference value; selecting, from the basic impression words, ones corresponding to the selected elements as final impression words; and storing a signal representing the final impression words into the storage in relation to the selected one of the music pieces.

A tenth aspect of this invention provides a computer program for music-piece classification which comprises the steps of reading out, from a storage, a bibliographic information segment about selected one of music pieces; generating, on the basis of the read-out bibliographic information segment, a first impression vector of elements being confidences corresponding to respective basic impression words; reading out, from the storage, an audio signal representing the selected one of the music pieces; calculating an acoustic feature quantity of the read-out audio signal; generating, on the basis of the calculated acoustic feature quantity, a second impression vector of elements being probabilities corresponding to the respective basic impression words; adding the elements in the first impression vector and the elements in the second impression vector to generate combination values corresponding to the respective basic impression words, and generating a third impression vector of elements being the generated combination values corresponding to the respective basic impression words; selecting a prescribed number of successive greatest ones from the elements in the third impression vector; selecting, from the basic impression words, ones corresponding to the selected elements as final impression words; and storing a signal representing the final impression words into the storage in relation to the selected one of the music pieces.

An eleventh aspect of this invention provides a music-piece classifying method comprising the steps of reading out, from a storage, a bibliographic information segment about selected one of music pieces; generating a bibliographic-information impression word on the basis of the read-out bibliographic information segment; reading out, from the storage, an audio signal representing the selected one of the music pieces; calculating an acoustic feature quantity of the read-out audio signal; generating a feature-quantity impression word on the basis of the calculated acoustic feature quantity; determining a degree of conformity between the generated bibliographic-information impression word and the generated feature-quantity impression word; deciding whether or not the determined conformity degree is greater than a predetermined threshold value; selecting both the generated bibliographic-information impression word and the generated feature-quantity impression word as final impression words when it is decided that the determined conformity degree is greater than the predetermined threshold value; and storing a signal representing the final impression words into the storage in relation to the selected one of the music pieces.

A twelfth aspect of this invention provides a music-piece classifying apparatus comprising first means for storing audio signals representing music pieces respectively; second means for storing bibliographic information segments about the respective music pieces represented by the audio signals stored in the first means; third means for reading out, from the second means, a bibliographic information segment about selected one of the music pieces; fourth means for generating a bibliographic-information impression word on the basis of the bibliographic information segment read out by the third means; fifth means for reading out, from the first means, an audio signal representing the selected one of the music pieces; sixth means for calculating an acoustic feature quantity of the audio signal read out by the fifth means; seventh means for generating a feature-quantity impression word on the basis of the acoustic feature quantity calculated by the sixth means; eighth means for determining a degree of conformity between the bibliographic-information impression word generated by the fourth means and the feature-quantity impression word generated by the seventh means; ninth means for deciding whether or not the conformity degree determined by the eighth means is greater than a predetermined threshold value; tenth means for selecting one from the bibliographic-information impression word generated by the fourth means and the feature-quantity impression word generated by the seventh means as a final impression word when the ninth means decides that the conformity degree determined by the eighth means is not greater than the predetermined threshold value; and eleventh means for storing a signal representing the final impression word selected by the tenth means in relation to the selected one of the music pieces.

A thirteenth aspect of this invention is based on the twelfth aspect thereof, and provides a music-piece classifying apparatus further comprising twelfth means for selecting both the bibliographic-information impression word generated by the fourth means and the feature-quantity impression word generated by the seventh means as final impression words when the ninth means decides that the conformity degree determined by the eighth means is greater than the predetermined threshold value, and thirteenth means provided in the eleventh means for storing either a signal representing the final impression words selected by the twelfth means or the signal representing the final impression word selected by the tenth means in relation to the selected one of the music pieces.

A fourteenth aspect of this invention provides a computer program for music-piece classification which comprises the steps of reading out, from a storage, a bibliographic information segment about selected one of music pieces; generating a bibliographic-information impression word on the basis of the read-out bibliographic information segment; reading out, from the storage, an audio signal representing the selected one of the music pieces; calculating an acoustic feature quantity of the read-out audio signal; generating a feature-quantity impression word on the basis of the calculated acoustic feature quantity; determining a degree of conformity between the generated bibliographic-information impression word and the generated feature-quantity impression word; deciding whether or not the determined conformity degree is greater than a predetermined threshold value; selecting one from the generated bibliographic-information impression word and the generated feature-quantity impression word as a final impression word when it is decided that the determined conformity degree is not greater than the predetermined threshold value; and storing a signal representing the final impression word into the storage in relation to the selected one of the music pieces.

A fifteenth aspect of this invention is based on the fourteenth aspect thereof, and provides a computer program further comprising the step of selecting both the generated bibliographic-information impression word and the generated feature-quantity impression word as final impression words when it is decided that the determined conformity degree is greater than the predetermined threshold value, and wherein the storing step comprises the step of storing a signal representing the final impression word or words into the storage in relation to the selected one of the music pieces.

A sixteenth aspect of this invention provides a music-piece classifying method comprising the steps of reading out, from a storage, a bibliographic information segment about selected one of music pieces; generating a bibliographic-information impression word on the basis of the read-out bibliographic information segment; reading out, from the storage, an audio signal representing the selected one of the music pieces; calculating an acoustic feature quantity of the read-out audio signal; generating a feature-quantity impression word on the basis of the calculated acoustic feature quantity; determining a degree of conformity between the generated bibliographic-information impression word and the generated feature-quantity impression word; deciding whether or not the determined conformity degree is greater than a predetermined threshold value; selecting one from the generated bibliographic-information impression word and the generated feature-quantity impression word as a final impression word when it is decided that the determined conformity degree is not greater than the predetermined threshold value; and storing a signal representing the final impression word into the storage in relation to the selected one of the music pieces.

A seventeenth aspect of this invention is based on the sixteenth aspect thereof, and provides a music-piece classifying method further comprising the step of selecting both the generated bibliographic-information impression word and the generated feature-quantity impression word as final impression words when it is decided that the determined conformity degree is greater than the predetermined threshold value, and wherein the storing step comprises the step of storing a signal representing the final impression word or words into the storage in relation to the selected one of the music pieces.

This invention has the following advantages. A bibliographic information segment about a music piece is converted into a bibliographic-information impression word or words. Feature quantities of an audio signal representing the music piece are converted into a feature-quantity impression word or words. At least one of the bibliographic-information impression word or words and the feature-quantity impression word or words is selected as a final impression word assigned to the music piece. In the word selection for deciding the final impression word, the bibliographic-information impression word or words and the feature-quantity impression word or words complement each other. Thus, the assigned final impression word is proper. Accordingly, it is possible to provide accurate music-piece classification to the user.

BRIEF DESCRIPTION OF THE DRAWINGS

FIG. 1 is a block diagram of a music-piece classifying apparatus according to a first embodiment of this invention.

FIG. 2 is an operation flow diagram of the music-piece classifying apparatus in FIG. 1.

FIG. 3 is a diagram showing an example of the format of bibliographic information segments.

FIG. 4 is a diagram showing an example of a portion of a conversion table designed for an item "title" in the first embodiment of this invention.

FIG. 5 is a diagram showing an example of a portion of a conversion table designed for an item "genre" in the first embodiment of this invention.

FIG. 6 is a diagram showing an example of a portion of a conversion table designed for an item "artist name" in the first embodiment of this invention.

FIG. 9 is a diagram showing an example of computed acoustic feature quantities of audio signals corresponding to content IDs being "ID1" and "ID2".

FIG. 12 is a diagram showing an example of a portion of a conformity degree table.

FIG. 13 is a diagram showing an example of a bibliographic-information impression word, a feature-quantity impression word, a probability, a conformity degree, and a conformity-degree threshold value for a music piece.

FIG. 14 is a diagram showing an example of a probability, examples of a probability threshold value, and examples of adopted impression words.

FIG. 15 is a diagram of an example of the correspondence between final impression words and content IDs.

FIG. 16 is a diagram of an example of a picture indicated by a display in FIG. 1.

FIG. 19 is a diagram showing an example of a portion of a conversion table designed for an item "title" in a second embodiment of this invention.

FIG. 20 is a diagram showing an example of a portion of a conversion table designed for an item "genre" in the second embodiment of this invention.

FIG. 21 is a diagram showing an example of a portion of a conversion table designed for an item "artist name" in the second embodiment of this invention.

FIG. 22 is a diagram showing an example of a portion of a conversion table designed for an item "year" in the second embodiment of this invention.

FIG. 23 is a diagram showing an example of the contents of a bibliographic information segment, impression words, confidences, and confidence totals.

FIG. 24 is a diagram showing an example of a portion of a second impression vector.

FIG. 25 is a diagram showing an example of a portion of a first impression vector.

FIG. 26 is a diagram showing another example of a portion of the second impression vector.

FIG. 27 is a diagram showing an example of final impression words, a conformity degree, and an impression-word adoption state.

FIG. 29 is a diagram showing an example of basic impression words and portions of a first impression vector, a second impression vector, and a combination impression vector in a third embodiment of this invention.

FIG. 30 is a diagram showing an example of pairs of final impression words, conformity degrees for the respective pairs, and results of comparison of the conformity degrees with a predetermined threshold value.

FIG. 31 is a diagram showing an example of final impression words, combination values, and impression-word adoption states.

DETAILED DESCRIPTION OF THE INVENTION

First Embodiment

Figure 7:
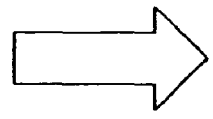
FIG. 7 is a diagram showing a first example of the contents of a bibliographic information segment, conversion-result impression words, and assigned impression words.

FIG. 1 shows a music-piece classifying apparatus 1 according to a first embodiment of this invention. The music-piece classifying apparatus 1 is provided in, for example, a music playback system having a recording medium storing a multitude of music contents or a personal computer system storing a multitude of music contents downloaded from a server through a communication network according to a music distribution service.

With reference to FIG. 1, the music-piece classifying apparatus 1 includes a computer system having a combination of an input/output port 2, a CPU 3, a ROM 4, a RAM 5, and a storage unit 6. The music-piece classifying apparatus 1 operates in accordance with a control program (a computer program) stored in the ROM 4, the RAM 5, or the storage unit 6. The storage unit 6 includes a large-capacity memory or a combination of a hard disk and a drive therefor. The input/output port 2 is connected with an input device 10 and a display 40.

The music-piece classifying apparatus 1 may be provided in a music recording and reproducing apparatus or a portable music player.

FIG. 2 basically shows the flow of operation of the music-piece classifying apparatus 1. As shown in FIG. 2, the music-piece classifying apparatus 1 is divided into a control section 20 and a storage section 30. The control section 20 is formed mainly by the CPU 3. The storage section 30 is formed mainly by the storage unit 6.

The control section 20 implements a bibliographic-information acquiring block 21, a bibliographic-information converting block 22, a feature-quantity computing block 23, a feature-quantity converting block 24, and an impression-word selecting block 25.

The storage section 30 implements an impression-word storing block 31, a music-piece storing block 32, and a bibliographic-information storing block 33.

The bibliographic-information acquiring block 21 reads out a bibliographic information segment about each music piece from the bibliographic-information storing block 33. The bibliographic information segment includes an information segment related to the music piece which represents the title, the artist name, the genre, and the year of the music piece.

The bibliographic-information converting block 22 converts the bibliographic information segment read out by the bibliographic-information acquiring block 21 into an impression word or words expressing human's subjective impressions about the music piece. The impression word or words are, for example, "forceful", "upbeat", "gentle", and "heavy". The impression word or words obtained by the bibliographic-information converting block 22 are referred to as the bibliographic-information impression word or words.

The feature-quantity computing block 23 reads out an audio signal representative of the music piece from the music-piece storing block 32. The feature-quantity computing block 23 analyzes the read-out audio signal in a conventional way, for example, a way disclosed by Japanese patent application publication number 6-290574/1994 or Japanese patent application publication number 2002-278547, and thereby computes acoustic feature quantities (acoustic feature values) of the audio signal.

The feature-quantity converting block 24 converts the acoustic feature quantities computed by the feature-quantity computing block 23 into an impression word. The impression word is, for example, "forceful", "upbeat", "gentle", or "heavy". The impression word obtained by the feature-quantity converting block 24 is referred to as the feature-quantity impression word.

The impression-word selecting block 25 selects one or ones as a final impression word or words from the bibliographic-information impression word or words obtained by the bibliographic-information converting block 22 and the feature-quantity impression word or words obtained by the feature-quantity converting block 24. Thereby, for each of the music pieces, the impression-word selecting block 25 generates a final impression word or words. The impression-word selecting block 25 recognizes the correspondence between the generated final impression words and the music pieces.

The impression-word storing block 31 stores text data representing final impression words generated by the impression-word selecting block 25. The final impression words are made to correspond to the music pieces.

The music-piece storing block 32 stores two or more audio signals representative of the respective music pieces. It should be noted that the music-piece storing block 32 may store only one audio signal representative of a music piece. Preferably, the audio signals in the music-piece storing block 32 are of the digital type.

The bibliographic-information storing block 33 stores bibliographic information segments about the respective music pieces represented by the audio signals in the music-piece storing block 32.

Different content IDs (identification code words) are assigned to the music pieces, respectively. The impression words represented by the text data in the impression-word storing block 31, the music pieces represented by the audio signals in the music-piece storing block 32, and the bibliographic information segments in the bibliographic-information storing block 33 are made in a relation utilizing the content IDs.

The input device 10 can be actuated by a user. The input device 10 includes, for example, a mouse, a keyboard, or a remote control device. The display 40 includes, for example, a liquid crystal display. The display 40 can be used to indicate the result of music-piece classification to the user.

It should be noted that the input device 10 and the display 40 may be incorporated in the music-piece classifying apparatus 1. There may be provided a client and a server connected by a communication network. In this case, the input device 10 and the display 40 are placed in the client while the music-piece classifying apparatus 1 is located in the server.

The music-piece classifying apparatus 1 operates as follows. When a user requests start of classification by actuating the input device 10, the control section 20 searches the music-piece storing block 32 for content IDs of first music pieces represented by all audio signals therein. Then, the control section 20 searches the impression-word storing block 31 for content IDs of second music pieces which have already been assigned final impression words represented by all text data therein. The control section 20 collates the content IDs of the second music pieces with the content IDs of the first music pieces to detect the content ID or IDs of a third music piece or pieces which have not been assigned final impression words yet. A signal representing the detected content ID or IDs of the third music piece or pieces is stored in the RAM 5 or the storage unit 6. In the case where there are the content IDs of plural third music pieces, the control section 20 sequentially selects one therefrom. On the other hand, in the case where there is only the content ID of a single third music piece, the control section 20 handles it as selected one.

The music-piece classifying apparatus 1 assigns a final impression word or words to the single third music piece or each of the plural third music pieces by carrying out a word assignment procedure mentioned below.

The bibliographic-information acquiring block 21 reads out, from the bibliographic-information storing block 33, a bibliographic information segment about a music piece assigned a content ID equal to the selected content ID.

FIG. 3 shows an example of the format of bibliographic information segments in the bibliographic-information storing block 33. In FIG. 3, rows denote bibliographic information segments respectively. A bibliographic information segment in each row represents the content ID, the title, the artist name, the genre, and the year of a corresponding music piece.

The bibliographic-information converting block 22 converts the bibliographic information segment read out by the bibliographic-information acquiring block 21 into a bibliographic-information impression word or words. The conversion by the bibliographic-information converting block 22 utilizes at least one prescribed conversion table which lists input words, and output words (bibliographic-information impression words) assigned to the respective input words. The conversion table is designed for one or more of the items (the title, the artist name, the genre, and the year) represented by a bibliographic information segment. Data representing the conversion table or tables is stored in the ROM 4, the RAMS, or the storage unit 6 in advance.

Specifically, the bibliographic-information converting block 22 extracts words from the read-out bibliographic information segment. Then, the bibliographic-information converting block 22 applies the extracted words to the conversion table or tables as input words, and obtains output words from the conversion table or tables which are assigned to the applied input words. The bibliographic-information converting block 22 labels one or ones of the obtained output words as the bibliographic-information impression word or words. The bibliographic-information impression word or words are ones among prescribed words.

FIG. 4 shows an example of a portion of a conversion table designed for the item "title" and used by the bibliographic-information converting block 22. The conversion table in FIG. 4 lists input words in the title, and bibliographic-information impression words (output words) assigned to the respective input words. In FIG. 4, the bibliographic-information impression word (the output word) "gentle" is assigned to the input word "nocturne" in the title, and the bibliographic-information impression word (the output word) "simple" is assigned to the input word "pastorale" in the title.

FIG. 5 shows an example of a portion of a conversion table designed for the item "genre" and used by the bibliographic-information converting block 22. The conversion table in FIG. 5 lists input words in the genre, and bibliographic-information impression words (output words) assigned to the respective input words. In FIG. 5, the bibliographic-information impression word (the output word) "mild" is assigned to the input word "easy listening" in the genre, and the bibliographic-information impression words (the output words) "upbeat" and "sophisticated" are assigned to the input word "House" in the genre. Furthermore, the bibliographic-information impression word (the output word) "gentle" is assigned to the input word "New Age" in the genre, and the bibliographic-information impression word (the output word) "heavy" is assigned to the input word "Industrial" in the genre. In addition, the input word "poem reading" in the genre is labeled "other" to be discriminated from other input words. No bibliographic-information impression word (no output word) is assigned to the input word "rock" in the genre.

According to an example of a conversion table designed for the item "year" and used by the bibliographic-information converting block 22, the bibliographic-information impression word (the output word) "simple" is assigned to the year (the input word) before 1960. The conversion table may provide the following negative assignment in combination with another conversion table. The bibliographic-information impression word (the output word) "heavy" is not assigned to the year (the input word) before 1980.

FIG. 6 shows an example of a portion of a conversion table designed for the item "artist name" and used by the bibliographic-information converting block 22. The conversion table in FIG. 6 lists input words in the artist name, and bibliographic-information impression words (output words) assigned to the respective input words. In FIG. 6, the bibliographic-information impression word (the output word) "forceful" is assigned to the artist (the input word) "A", and the bibliographic-information impression word (the output word) "gentle" is assigned to the artist (the input word) "B". Furthermore, the bibliographic-information impression word (the output word) "mild" is not assigned to the artist (the input word) "C".

It should be noted that the conversion table or tables used by the bibliographic-information converting block 22 may store only code words or code numbers for identifying respective input and output words. The bibliographic-information impression words (output words) may include living-scene-expressing words, season-expressing words, time-expressing words, and weather-expressing words such as "drive", "meal", "spring", "morning", and "rain".

As previously mentioned, the conversion table or tables used by the bibliographic-information converting block 22 are designed for one or more of the items (the title, the artist name, the genre, and the year) represented by a bibliographic information segment. The conversion table designed for two or more of the items causes the word conversion by the bibliographic-information converting block 22 to relate to two or more of the items. There may be provided conversion tables for the respective items. In this case, the conversion tables are used by the bibliographic-information converting block 22 so that the word conversion by the bibliographic-information converting block 22 relates to two or more of the items.

With reference to FIG. 7, a bibliographic information segment represents that the title, the artist name, the genre, and the year of a corresponding music piece are "pastorale", "AAA", "easy listening", and "1999" respectively. According to an example of the word conversion by the bibliographic-information converting block 22 which relates to the items "title", "artist name", and "genre", the input word "pastorale" in the title is converted into the bibliographic-information impression word (the output word) "simple". Furthermore, the input word "AAA" in the artist name is converted into the bibliographic-information impression word (the output word) "mild". In addition, the input word "easy listening" in the genre is converted into the bibliographic-information impression word (the output word) "mild". In this case, the two words "mild" are handled as a single word "mild" and OR is taken between "simple" and "mild", and consequently the bibliographic information segment in FIG. 7 is converted into the bibliographic-information impression words "simple" and "mild".

Figure 8:
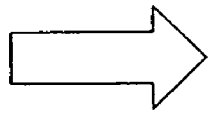
FIG. 8 is a diagram showing a second example of the contents of a bibliographic information segment, and conversion-result impression words, and an assigned impression word.

With reference to FIG. 8, a bibliographic information segment represents that the title, the artist name, the genre, and the year of a corresponding music piece are "powerful", "ABC", "soul", and "1975" respectively. According to an example of the word conversion by the bibliographic-information converting block 22 which relates to the items "title", "artist name", "genre", and "year", the input word "powerful" in the title is converted into the bibliographic-information impression word (the output word) "forceful". Furthermore, the input word "soul" in the genre is converted into the bibliographic-information impression word (the output word) "passionate". On the other hand, the bibliographic-information impression word (the output word) "forceful" is not assigned to the input word "ABC" in the artist name. Furthermore, the bibliographic-information impression word (the output word) "heavy" is not assigned to the input word "1975" in the year. In this case, the positive assignment of "forceful" and the negative assignment of "forceful" cancel each other, and the negative assignment of "heavy" is neglected. Consequently, the bibliographic information segment in FIG. 8 is converted into the bibliographic-information impression word "passionate".

With reference back to FIG. 2, the feature-quantity computing block 23 reads out each of the audio signals representative of the music pieces from the music-piece storing block 32. The feature-quantity computing block 23 analyzes each read-out audio signal in a conventional way, for example, a way disclosed by Japanese patent application publication number 6-290574/1994 or Japanese patent application publication number 2002-278547, and thereby computes acoustic feature quantities of the read-out audio signal. The computed acoustic feature quantities are, for example, rhythm-related quantities, tempo-related quantities, and spectrum-related quantities of the read-out audio signal.

Typical examples of the computed acoustic feature quantities of the read-out audio signal are as follows. The derivatives x(n) of the acoustic powers of the read-out audio signal are computed for each prescribed time interval (each frame), where "n" denotes a time-series data index number and n=1, 2, 3, ..., K. The power derivatives x(n) equal to or less than a prescribed value are forcibly set to "0". The mean and variance of the power derivatives x(n) are computed. The computed mean and variance are typical examples of the computed acoustic feature quantities. The autocorrelation R(J) of the power derivatives x(n) is calculated according to an equation expressed as:

$$R(J) = \frac{1}{K-J} \sum_{n=1}^{K-J} x(n)x(n+J) \quad (1)$$

The autocorrelation time-difference J in the equation (1) is determined at which the autocorrelation R(J) is maximized in the case where the time-difference J is varied between prescribed constant values J1 and J2. The determined time-difference J is denoted by JMmax. The value JMmax is a typical example of one of the computed acoustic feature quantities which relates to the tempo of the music piece represented by the read-out audio signal.

FIG. 9 shows an example of the computed acoustic feature quantities of each of audio signals corresponding to the content IDs being "ID1" and "ID2". For each of the audio signals, the computed acoustic feature quantities are numbered from "1" to "N", where "N" denotes a predetermined natural number. Thus, the computed acoustic feature quantities constitute an N-dimension vector. In FIG. 9, the acoustic feature quantities "1", "2", and "N" of the audio signal corresponding to the content ID being "ID 1" are equal to "0.012003", "0.129869", and "0.220436" respectively. The acoustic feature quantities "1", "2", and "N" of the audio signal corresponding to the content ID being "ID2" are equal to "0.03178", "0.117536", and "0.174924" respectively.

The feature-quantity converting block 24 converts the acoustic feature quantities computed by the feature-quantity computing block 23 into a feature-quantity impression word. The feature-quantity impression word is one among prescribed words equal to or different from those for the bibliographic-information impression words. The conversion of the computed acoustic feature quantities into the feature-quantity impression word is in a conventional way utilizing a decision tree, Bayes' rule, or an artificial neural network.

Figure 10:
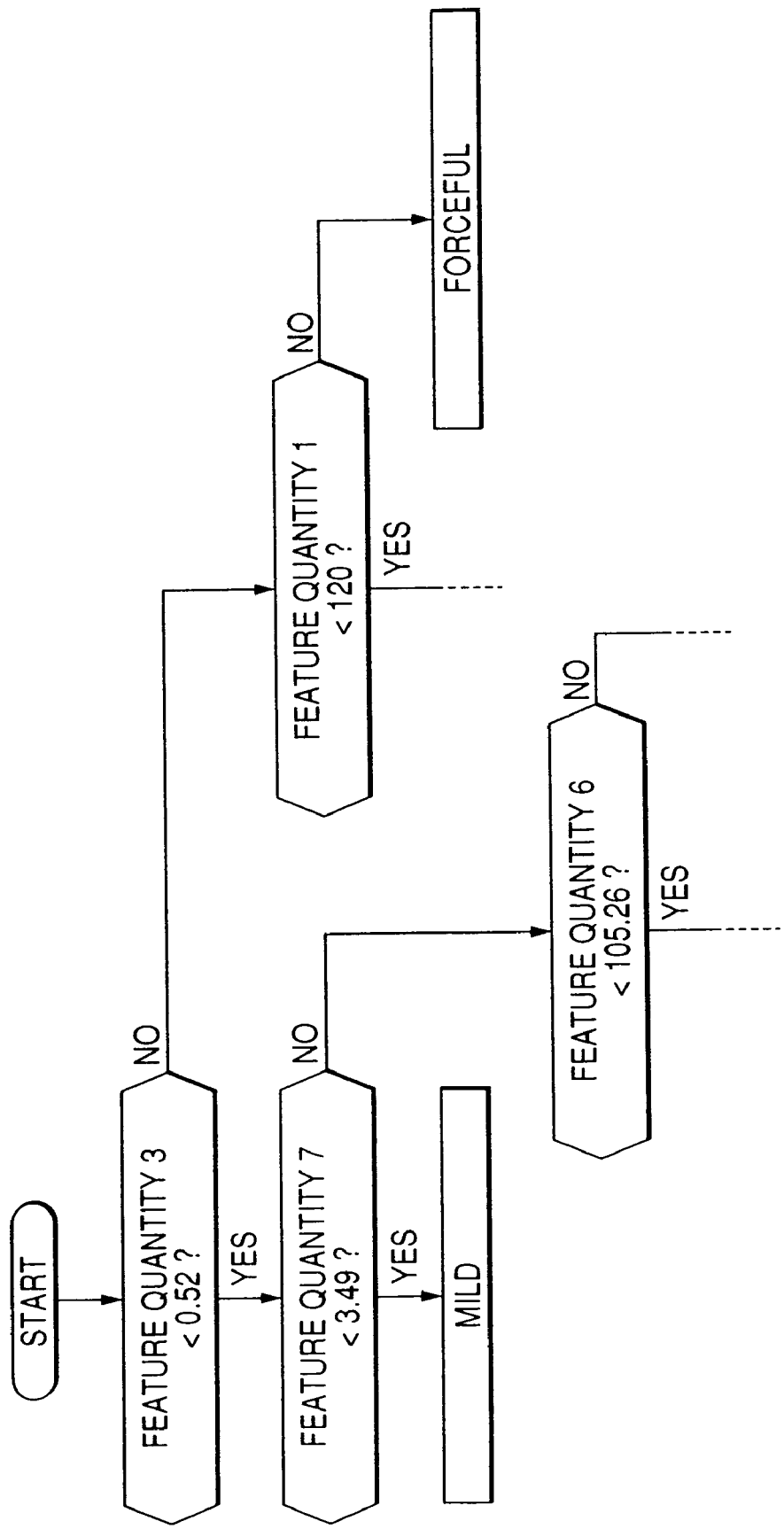
FIG. 10 is a flow diagram of an example of a decision-tree-based algorithm.

FIG. 10 shows an example of a decision-tree-based algorithm by which the feature-quantity converting block 24 converts the computed acoustic feature quantities into the feature-quantity impression word. According to the decision-tree-based algorithm in FIG. 10, the computed acoustic feature quantities are converted into the feature-quantity impression word "forceful" when the computed feature quantity "3" is equal to or greater than "0.52" and the computed feature quantity "1" is equal to or greater than "120". The computed acoustic feature quantities are converted into the feature-quantity impression word "mild" when the computed feature quantity "3" is smaller than "0.52" and the computed feature quantity "7" is smaller than "3.49".

An example of the utilization of Bayes' rule by the feature-quantity converting block 24 is as follows. The computed acoustic feature quantities "x" are expressed by an N-dimension vector (x1, x2, x3, ..., xN). There are M different prescribed words from which the feature-quantity converting block 24 selects one as an output feature-quantity impression word (a conversion-result word), where M denotes a predetermined natural number. Namely, there are M different candidate feature-quantity impression words $C_1, C_2, C_3, \ldots, C_M$. The feature-quantity converting block 24 selects one as an output feature-quantity impression word (a conversion-result word) $C_k$ from the candidate feature-quantity impression words $C_1, C_2, C_3, \ldots, C_M$ in response to the computed acoustic feature quantities "x" according to the following equation.

$$C_k = \underset{i \in \{1, \ldots, M\}}{\operatorname{argmax}} P(C_i | x) \quad (2)$$
$$= \underset{i \in \{1, \ldots, M\}}{\operatorname{argmax}} P(C_i) \cdot P(x | C_i)$$

where $P(C_i|x)$ denotes a conditional probability that the computed acoustic feature quantities "x" will be converted into a feature-quantity impression word $C_i$ (i=1, ..., M); $P(x|C_i)$ denotes a conditional probability that computed acoustic feature quantities will be those "x" for a feature-quantity impression word $C_i$; and $P(C_i)$ denotes a prior probability that a conversion-result word will be a feature-quantity impression word $C_i$.

Data representing the prior probabilities $P(C_i)$ and data representing the conditional probabilities P(x|Ci) for the M candidate feature-quantity impression words are stored in the ROM 4, the RAM 5, or the storage unit 6 in advance, where $P(C_i)=P(C_1)$, $P(C_2)$, ..., $P(C_M)$ and P(x|Ci)=P(x|C_1), $P(x|C_2)$, ..., $P(x|C_M)$. The feature-quantity converting block 24 refers to these data in response to the computed acoustic feature quantities "x", and thereby obtains the prior probabilities $P(C_i)$ and the conditional probabilities P(x|Ci). Then, the feature-quantity converting block 24 computes the products $P(C_i) \cdot P(x|C_i)$ of the obtained prior probabilities $P(C_i)$ and the obtained conditional probabilities P(x|Ci). Subsequently, the feature-quantity converting block 24 detects maximum one among the computed products $P(C_i) \cdot P(x|C_i)$. Then, the feature-quantity converting block 24 detects one among the M candidate feature-quantity impression words which corresponds to the detected maximum product. Thereafter, the feature-quantity converting block 24 labels the detected feature-quantity impression word as a conversion-result word $C_k$. Finally, the feature-quantity converting block 24 outputs the conversion-result feature-quantity impression word $C_k$ and the corresponding conditional probability $P(C_k|x)$.

Figure 11:
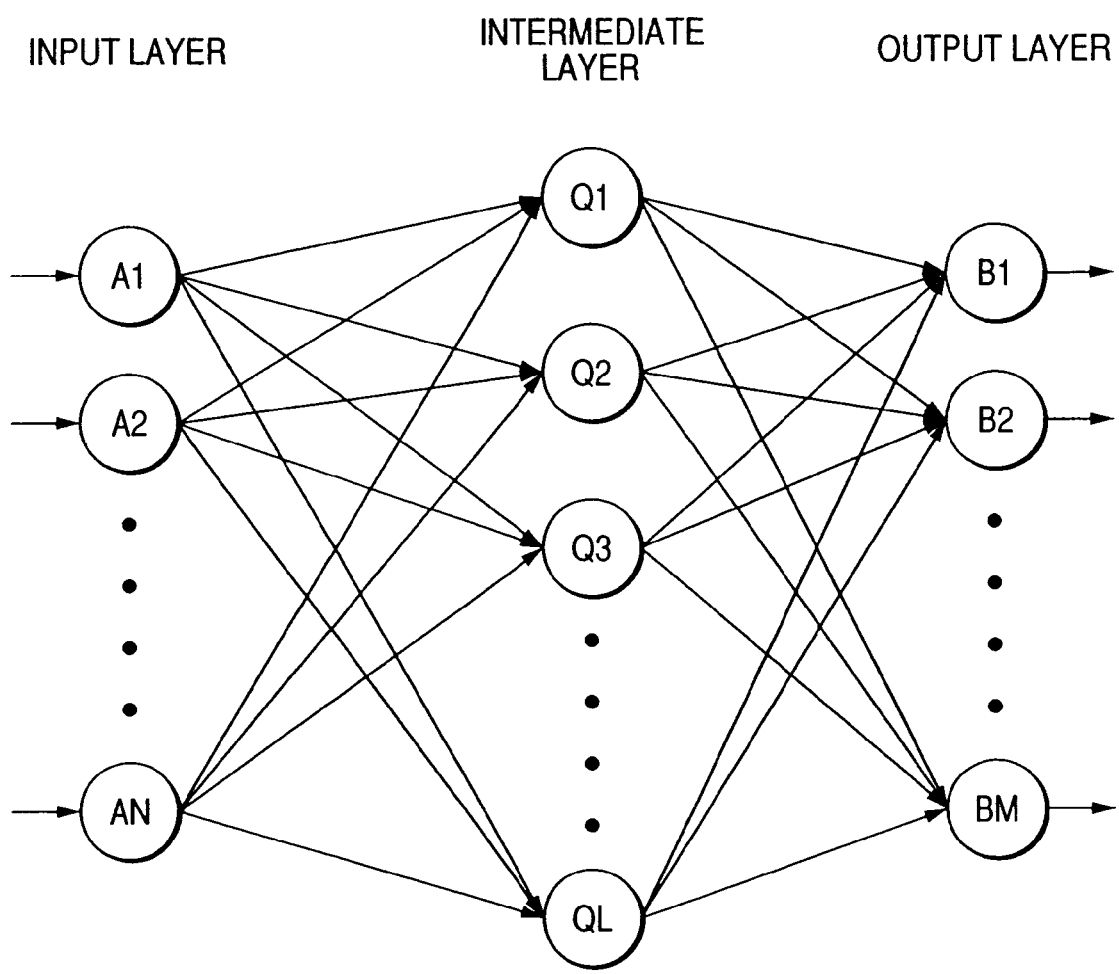
FIG. 11 is a diagram of an example of an artificial neural network.

FIG. 11 shows an example of an artificial neural network utilized by the feature-quantity converting block 24. As shown in FIG. 11, the artificial neural network has an input layers of neurons A1, A2, ..., AN, an intermediate layer of neurons Q1, Q2, ..., QL, and an output layer of neurons B1, B2, ..., BM, where N, L, and M denote predetermined natural numbers. Each of the neurons in the intermediate layer is connected with all the neurons in the input layer and all the neurons in the output layer. The neurons A1, A2, ..., AN in the input layer are designed to correspond to the acoustic feature quantities "1", "2", . . . , "N" of an audio signal, respectively. Accordingly, the acoustic feature quantities "1", "2", . . . , "N" are applied to the neurons A2, A2, . . . , AN as values inputted thereto. The neurons B1, B2, . . . , BM in the output layer are designed to correspond to the M candidate feature-quantity impression words, respectively.

Each of all the neurons in the artificial neural network responds to values inputted thereto. Specifically, the neuron multiplies the values inputted thereto with weights respectively, and sums the multiplication results. When the multiplication-results sum exceeds a threshold value, the neuron outputs the sum as an output value. Otherwise, the neuron outputs "0". The artificial neural network is subjected to a training procedure before being actually utilized by the feature-quantity converting block 24. As a result of the training procedure, the weights and the threshold values of all the neurons are determined so that the artificial neural network is completed.

The feature-quantity converting block 24 applies the acoustic feature quantities "1", "2", . . . , "N" of the audio signal to the neurons A1, A2, . . . , AN in the input layer of the completed artificial neural network as input values respectively. Then, the feature-quantity converting block 24 detects maximum one among values outputted from the neurons B1, B2, . . . , BM in the output layer of the completed artificial neural network. The values outputted from the neurons B1, B2, . . . , BM can also be used as probabilities. The feature-quantity converting block 24 identifies an output-layer neuron outputting the detected maximum value. Subsequently, the feature-quantity converting block 24 detects one among the M candidate feature-quantity impression words which corresponds to the identified output-layer neuron outputting the maximum value. Thereafter, the feature-quantity converting block 24 labels the detected feature-quantity impression word as a conversion-result word. Finally, the feature-quantity converting block 24 outputs the conversion-result feature-quantity impression word. In addition, the feature-quantity converting block 24 outputs the detected maximum value as a probability corresponding to the conversion-result word.

As previously mentioned, the feature-quantity converting block 24 outputs a conversion-result feature-quantity impression word and a probability corresponding thereto. It should be noted that the probability outputted from the feature-quantity converting block 24 means a probability factor or a confidence factor variable up to a value greater than "1".

The impression-word selecting block 25 selects one or ones as a final impression word or words from the bibliographic-information impression word or words obtained by the bibliographic-information converting block 22 and the feature-quantity impression word obtained by the feature-quantity converting block 24 for each of the music pieces.

Specifically, the impression-word selecting block 25 decides whether the present music piece has a music content or a non-music content on the basis of the genre of the present music piece. An example of the non-music content is poem reading or speaking. When the present music piece has a non-music content, the impression-word selecting block 25 adopts only the bibliographic-information impression word or words as a final impression word or words. When the present music piece has a music content, the impression-word selecting block 25 detects the degree of conformity between the bibliographic-information impression word or words and the feature-quantity impression word by referring to a conformity degree table. The degree of conformity between a bibliographic-information impression word or words and a feature-quantity impression word for each of possible combinations of bibliographic-information impression words and feature-quantity impression words is predetermined, and the predetermined conformity degrees are collected to form the conformity degree table. Data representing the conformity degree table is stored in the ROM 4, the RAM 5, or the storage unit 6 in advance.

FIG. 12 shows an example of a portion of the conformity degree table. In FIG. 12, the conformity degree is equal to a low value, "0.05", for a combination of impression words "forceful" and "gentle". The conformity degree is equal to a high value, "0.85", for a combination of impression words "forceful" and "cheerful". The conformity degree is equal to a high value, "0.90", for a combination of impression words "forceful" and "upbeat".

The impression-word selecting block 25 compares the detected conformity degree with a predetermined threshold value (a conformity-degree threshold value). When the detected conformity degree is greater than the predetermined threshold value, the impression-word selecting block 25 adopts the bibliographic-information impression word or words and also the feature-quantity impression word as final impression words. In the absence of a bibliographic-information impression word or words obtained by the bibliographic-information converting block 22, the impression-word selecting block 25 adopts the feature-quantity impression word as a final impression word. When the detected conformity degree is equal to or smaller than the predetermined threshold value, the impression-word selecting block 25 decides whether or not the conversion of the computed acoustic feature quantities into the feature-quantity impression word by the feature-quantity converting block 24 is of the type outputting a probability. The conversion utilizing a decision tree is of the type not outputting a probability. On the other hand, the conversion utilizing Bayes' rule or an artificial neural network is of the type outputting a probability.

In the case where the conversion of the computed acoustic feature quantities into the feature-quantity impression word by the feature-quantity converting block 24 is of the type not outputting a probability, the impression-word selecting block 25 adopts either the bibliographic-information impression word (or words) or the feature-quantity impression word as a final impression word (or words) according to a predetermined word-selection rule represented by data previously stored in the ROM 4, the RAM 5, or the storage unit 6. On the other hand, in the case where the conversion is of the type outputting a probability, the impression-word selecting block 25 compares the outputted probability with a predetermined threshold value (a probability threshold value). When the outputted probability is greater than the predetermined threshold value, the impression-word selecting block 25 adopts the feature-quantity impression word as a final impression word. When the outputted probability is equal to or smaller than the predetermined threshold value, the impression-word selecting block 25 adopts the bibliographic-information impression word or words as a final impression word or words.

FIG. 13 shows an example of the bibliographic-information impression word obtained by the bibliographic-information converting block 22, the feature-quantity impression word obtained by the feature-quantity converting block 24, the probability outputted from the feature-quantity converting block 24, the conformity degree, and the conformity-degree threshold value for a music piece. In FIG. 13, the bibliographic-information impression word is "forceful", and the feature-quantity impression word is "gentle". Furthermore, the outputted probability, the conformity degree, and the conformity-degree threshold value are equal to "0.48", "0.05", and "0.5", respectively. In this case, the conformity degree is smaller than the conformity-degree threshold value, and the conversion of the computed acoustic feature quantities into the feature-quantity impression word by the feature-quantity converting block 24 is of the type outputting a probability. Therefore, the impression-word selecting block 25 compares the outputted probability with the probability threshold value. As shown in FIG. 14, the probability threshold value is equal to, for example, "0.4" or "0.5". When the probability threshold value is equal to "0.4", the outputted probability "0.48" is greater than the predetermined threshold value "0.4" so that the impression-word selecting block 25 adopts the feature-quantity impression word "gentle" as a final impression word. On the other hand, when the probability threshold value is equal to "0.5", the outputted probability "0.48" is smaller than the predetermined threshold value "0.5" so that the impression-word selecting block 25 adopts the bibliographic-information impression word "forceful" as a final impression word.

The above-mentioned word assignment procedure is iterated until all the third music pieces are assigned final impression words.

The impression-word storing block 31 stores text data representing the final impression words generated by the impression-word selecting block 25. As shown in FIG. 15, the final impression words in the impression-word storing block 31 are made to correspond to the music pieces through the use of content IDs.

The music-piece classifying apparatus 1 controls the display 40 to indicate a picture listing the final impression words represented by the text data in the impression-word storing block 31. FIG. 16 shows an example of the picture. The picture in FIG. 16 lists the final impression words including "forceful", "upbeat", "mild", and "gentle". The listed final impression words are in respective zones within the picture. The user can select one from the listed final impression words by actuating the input device 10. When one is selected from the listed final impression words, the music-piece classifying apparatus 1 searches the impression-word storing block 31 for content IDs corresponding to the selected final impression word. Then, the music-piece classifying apparatus 1 searches the bibliographic-information storing block 33 for bibliographic information segments corresponding to the search-result content IDs. Subsequently, the music-piece classifying apparatus 1 transfers portions of the search-result bibliographic information segments from the bibliographic-information storing block 33 to the display 40, and controls the display 40 to make the indicated picture have a window listing the titles and the artist names of music pieces which are represented by the transferred portions of the search-result bibliographic information segments. By actuating the input device 10, the user can select one from the listed titles or the listed artist names as an indication of a desired music piece to be played back. When one is selected from the listed titles or the listed artist names, the music-piece classifying apparatus 1 detects a content ID corresponding to the selected title or artist name. Then, the music-piece classifying apparatus 1 searches the music-piece storing block 32 for an audio signal representative of a music piece having a content ID equal to the detected content ID. Subsequently, the music-piece classifying apparatus 1 transfers the search-result audio signal from the music-piece storing block 32 to a music player (not shown), and controls the music player to reproduce the music piece represented by the search-result audio signal.

As previously mentioned, the music-piece classifying apparatus 1 operates in accordance with a control program (a computer program) stored in the ROM 4, the RAM 5, or the storage unit 6. The text data representing the final impression words, the audio signals representing the respective music pieces, the content IDs of the respective music pieces, and the bibliographic information segments about the respective music pieces are stored in the storage unit 6. The data representing the conversion table or tables, the data representing the prior probabilities $P(C_i)$ and the data representing the conditional probabilities $P(x|Ci)$ for the M candidate feature-quantity impression words, and the data representing the conformity degree table are stored in the ROM 4, the RAM 5, or the storage unit 6 in advance. Furthermore, the data representing the predetermined rule for selecting either the bibliographic-information impression word (or words) or the feature-quantity impression word as a final impression word (or words) is stored in the ROM 4, the RAM 5, or the storage unit 6 in advance.

Figure 17:
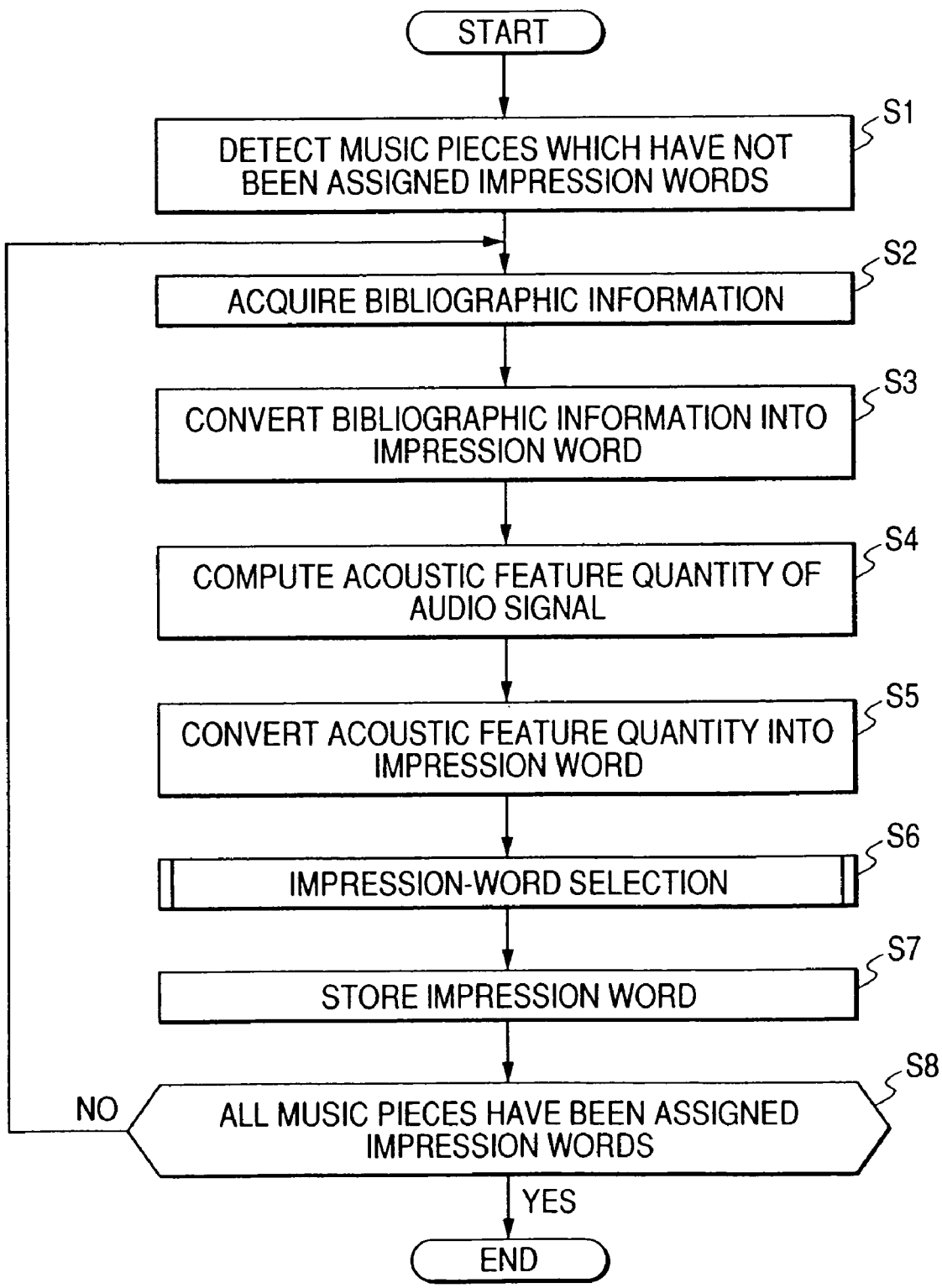
FIG. 17 is a flowchart of a segment of a control program for the music-piece classifying apparatus in FIG. 1.

FIG. 17 is a flowchart of a segment of the control program for the music-piece classifying apparatus 1 which relates to the word assignment procedure. The program segment in FIG. 17 is started when the user requests start of classification by actuating the input device 10.

As shown in FIG. 17, a first step S1 of the program segment searches the storage unit 6 for the content IDs of first music pieces represented by all the audio signals therein. Then, the step S1 searches the storage unit 6 for the content IDs of second music pieces which have already been assigned final impression words represented by all the text data therein. The step S1 collates the content IDs of the second music pieces with the content IDs of the first music pieces to detect the content ID or IDs of a third music piece or pieces which have not been assigned final impression words yet. After the step S1, the program advances to a step S2. In the case where there are plural third music pieces, a sequence of the step S2 and later steps is executed for each of the third music pieces. Otherwise, a sequence of the step S2 and later steps is executed once.

The step S2 selects one from the content IDs of the plural third music pieces. The content IDs of the plural third music pieces are sequentially selected as the step S2 is iteratively executed. In the case where there is only the content ID of a single third music piece, the step S2 handles it as selected one. The step S2 reads out, from the storage unit 6, a bibliographic information segment about a music piece having a content ID equal to the selected content ID.

A step S3 following the step S2 converts the read-out bibliographic information segment into a bibliographic-information impression word or words by referring to the conversion table or tables in the ROM 4, the RAM 5, or the storage unit 6. Specifically, the step S3 extracts words from the read-out bibliographic information segment. Then, the step S3 applies the extracted words to the conversion table or tables as input words, and obtains output words from the conversion table or tables which are assigned to the applied input words. The step S3 labels one or ones of the obtained output words as the bibliographic-information impression word or words.

A step S4 subsequent to the step S3 searches the storage unit 6 for an audio signal representing the music piece having the content ID equal to the selected content ID. The step S4 reads out the search-result audio signal from the storage unit 6. The step S4 analyzes the read-out audio signal in a conventional way, and thereby computes acoustic feature quantities (acoustic feature values) of the read-out audio signal. The computed acoustic feature quantities are, for example, rhythm-related quantities, tempo-related quantities, and spectrum-related quantities of the read-out audio signal.

A step S5 following the step S4 converts the computed acoustic feature quantities into a feature-quantity impression word in a conventional way utilizing a decision tree, Bayes' rule, or an artificial neural network. In the case where Bayes' rule is utilized, the step S5 refers to the prior probabilities $P(C_i)$ and the conditional probabilities $P(x|Ci)$ for the M candidate feature-quantity impression words which are represented by the data in the storage unit 6. The conversion by the step S5 which utilizes a decision tree is of the type not outputting a probability. On the other hand, the conversion utilizing Bayes' rule or an artificial neural network is of the type outputting a probability.

A block S6 subsequent to the step S5 selects one or ones as a final impression word or words from the bibliographic-information impression word or words obtained by the step S3 and the feature-quantity impression word obtained by the step S5.

A step S7 following the block S6 stores text data representative of the final impression word or words into the storage unit 6.

A step S8 subsequent to the step S7 decides whether or not all the content IDs of the plural third music pieces have been selected by the step S2. In the case where all the content IDs of the plural third music pieces have been selected, the program exits from the step S8 and then the current execution cycle of the program segment ends. Otherwise, the program returns from the step S8 to the step S2.

It should be noted that the steps S2, S4, and S5 may be arranged in the order as "S4→S5→S2".

Figure 18:
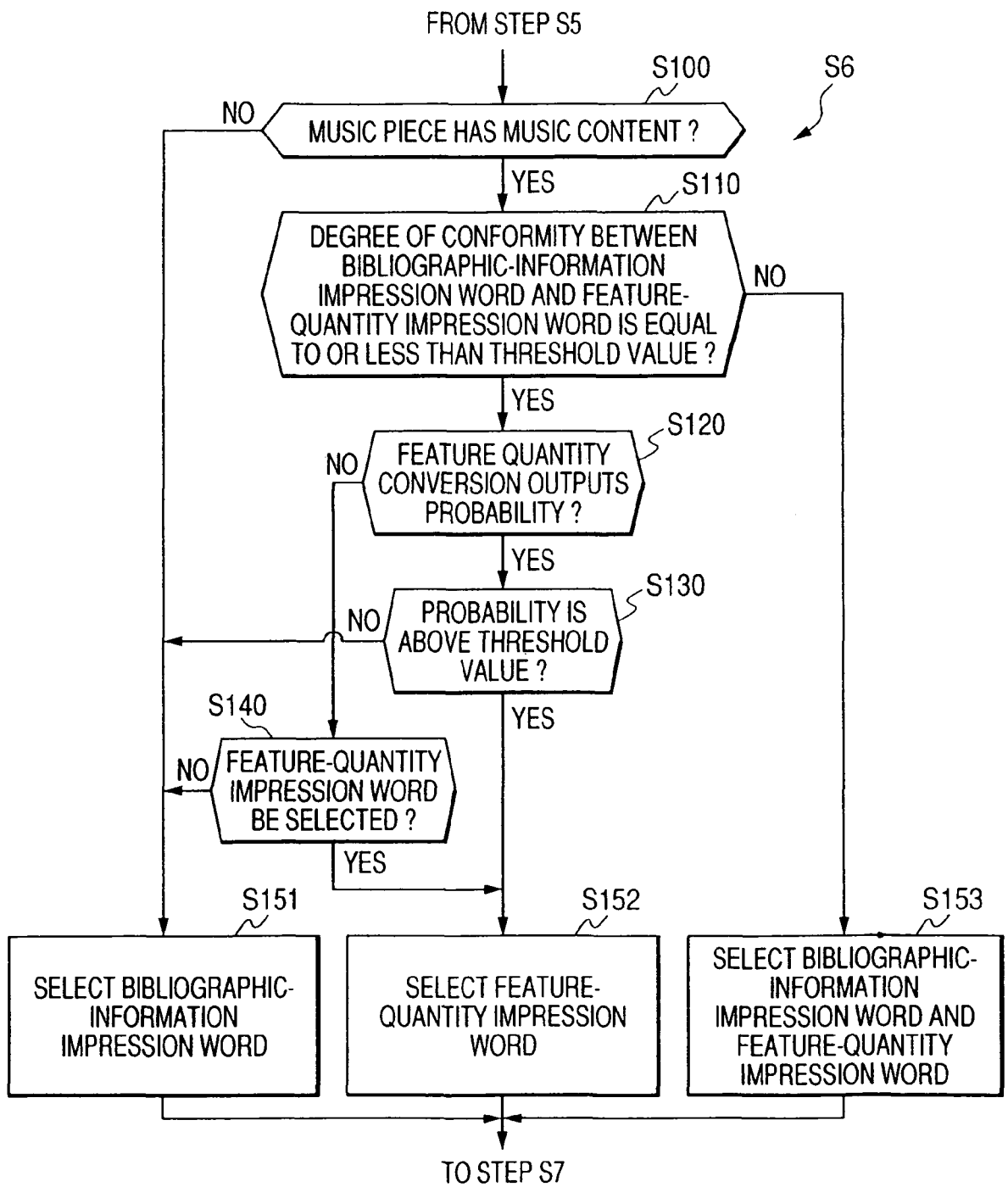
FIG. 18 is a flowchart of a block in FIG. 17.

FIG. 18 shows the details of the block S6. As shown in FIG. 18, the block S6 has a step S100 which follows the step S5 (see FIG. 17). The step S100 analyzes the bibliographic information segment about the music piece having a content ID equal to the selected content ID, and thereby detects the genre of the music piece. The step S100 decides whether the music piece has a music content or a non-music content on the basis of the detected genre thereof. When the music piece has a non-music content, the program advances from the step S100 to a step S151. When the music piece has a music content, the program advances from the step S100 to a step S110.

The step S110 detects the degree of conformity between the bibliographic-information impression word or words and the feature-quantity impression word by referring to the conformity degree table in the ROM 4, the RAM 5, or the storage unit 6. The step S110 compares the detected conformity degree with the predetermined threshold value (the conformity-degree threshold value). When the detected conformity degree is greater than the predetermined threshold value, the program advances from the step S110 to a step S153. When the detected conformity degree is equal to or smaller than the predetermined threshold value, the program advances from the step S110 to a step S120.

The step S120 decides whether or not the conversion of the computed acoustic feature quantities into the feature-quantity impression word by the step S5 is of the type outputting a probability. In the case where the conversion is of the type outputting a probability, the program advances from the step S120 to a step S130. On the other hand, in the case where the conversion is of the type not outputting a probability, the program advances from the step S120 to a step S140.

The step S130 compares the outputted probability with the predetermined threshold value (the probability threshold value). When the outputted probability is greater than the predetermined threshold value, the program advances from the step S130 to a step S152. Otherwise, the program advances from the step S130 to the step S151.

The step S140 accesses the ROM 4, the RAM 5, or the storage unit 6 to read out the predetermined word-selection rule represented by the data stored therein. The step S140 detects what is indicated by the read-out rule. When the read-out rule indicates that the bibliographic-information impression word (or words) should be selected as a final impression word (or words), the program advances from the step S140 to the step S151. On the other hand, when the read-out rule indicates that the feature-quantity impression word should be selected as a final impression word, the program advances from the step S140 to the step S152.

The step S151 selects the bibliographic-information impression word or words as a final impression word or words for the music piece having the content ID equal to the selected content ID. After the step S151, the program advances to the step S7 (see FIG. 17).

The step S152 selects the feature-quantity impression word as a final impression word for the music piece having the content ID equal to the selected content ID. After the step S152, the program advances to the step S7 (see FIG. 17).

The step S153 adopts the bibliographic-information impression word or words and also the feature-quantity impression word as final impression words for the music piece having the content ID equal to the selected content ID. After the step S153, the program advances to the step S7 (see FIG. 17).

As previously mentioned, a bibliographic information segment about a music piece is converted into a bibliographic-information impression word or words. Feature quantities of an audio signal representing the music piece are converted into a feature-quantity impression word. At least one of the bibliographic-information impression word or words and the feature-quantity impression word is selected as a final impression word assigned to the music piece. In the word selection for deciding the final impression word, the bibliographic-information impression word or words and the feature-quantity impression word complement each other. Thus, the assigned final impression word is proper. Accordingly, it is possible to provide accurate music-piece classification to the user.

Second Embodiment

A second embodiment of this invention is similar to the first embodiment thereof except for design changes mentioned hereafter. In the second embodiment of this invention, the conversion table or tables for converting a bibliographic information segment into a bibliographic-information impression word or words include predetermined confidences. Each predetermined confidence denotes a predetermined degree of the fitness or the validity of a corresponding bibliographic-information impression word.

The bibliographic-information converting block 22 converts the bibliographic information segment read out by the bibliographic-information acquiring block 21 into a vector (set) of confidence totals which corresponds to a set of all bibliographic-information impression words listed in the conversion table or tables. The vector of confidence totals is referred to as the first impression vector, and the set of all bibliographic-information impression words is called the first set of impression words. The conversion by the bibliographic-information converting block 22 utilizes at least one prescribed conversion table which lists input words, output words (bibliographic-information impression words) assigned to the respective input words, and confidences accompanying the respective output words. The conversion table is designed for one or more of the items (the title, the artist name, the genre, and the year) represented by a bibliographic information segment.

Specifically, the bibliographic-information converting block 22 extracts words from the read-out bibliographic information segment. Then, the bibliographic-information converting block 22 applies the extracted words to the conversion table or tables as input words, and obtains output words and confidences from the conversion table or tables which correspond to the applied input words. Usually, there are common ones among the obtained output words. The bibliographic-information converting block 22 labels different ones among the obtained output words as first bibliographic-information impression words. The bibliographic-information converting block 22 computes confidence totals regarding the first bibliographic-information impression words respectively. For a first bibliographic-information impression word corresponding to plural confidences, the bibliographic-information converting block 22 sums up the confidences to compute a confidence total. For a first bibliographic-information impression word corresponding to only one confidence, the bibliographic-information converting block 22 uses the confidence as a confidence total. All the bibliographic-information impression words listed in the conversion table or tables have second ones (non-hit ones) different from the first bibliographic-information impression words. The bibliographic-information converting block 22 sets a confidence total to "0" for each of the second bibliographic-information impression words (the non-hit bibliographic-information impression words). The bibliographic-information converting block 22 generates a vector (set) of the confidence totals corresponding to all the bibliographic-information impression words listed in the conversion table or tables. The vector of the confidence totals is referred to as the first impression vector.

FIG. 19 shows an example of a portion of a conversion table designed for the item "title" and used by the bibliographic-information converting block 22. The conversion table in FIG. 19 lists input words in the title, and bibliographic-information impression words (output words) assigned to the respective input words, and confidences accompanying the respective output words. In FIG. 19, the bibliographic-information impression word (the output word) "gentle" is assigned to the input word "nocturne" in the title and is accompanied with a confidence of "0.75", and the bibliographic-information impression word (the output word) "simple" is assigned to the input word "pastorale" in the title and is accompanied with a confidence of "0.82".

FIG. 20 shows an example of a portion of a conversion table designed for the item "genre" and used by the bibliographic-information converting block 22. The conversion table in FIG. 20 lists input words in the genre, and bibliographic-information impression words (output words) assigned to the respective input words, and confidences accompanying the respective output words. In FIG. 20, the bibliographic-information impression word (the output word) "mild" is assigned to the input word "easy listening" in the genre and is accompanied with a confidence of "0.9", and the bibliographic-information impression words (the output words) "upbeat" and "sophisticated" are assigned to the input word "House" in the genre and are accompanied with confidences of "0.95" and "0.6". Furthermore, the bibliographic-information impression word (the output word) "gentle" is assigned to the input word "New Age" in the genre and is accompanied with a confidence of "0.7", and the bibliographic-information impression word (the output word) "forceful" is assigned to the input word "rock" in the genre and is accompanied with a confidence of "0.2". In addition, the bibliographic-information impression word (the output word) "heavy" is assigned to the input word "Industrial" in the genre and is accompanied with a confidence of "0.87".

FIG. 21 shows an example of a portion of a conversion table designed for the item "artist name" and used by the bibliographic-information converting block 22. The conversion table in FIG. 21 lists input words in the artist name, and bibliographic-information impression words (output words) assigned to the respective input words, and confidences accompanying the respective output words. In FIG. 21, the bibliographic-information impression word (the output word) "forceful" is assigned to the artist (the input word) "A" and is accompanied with a confidence of "0.6", and the bibliographic-information impression word (the output word) "gentle" is assigned to the artist (the input word) "B" and is accompanied with a confidence of "0.8". Furthermore, the bibliographic-information impression word (the output word) "mild" is virtually assigned to the artist (the input word) "C" and is accompanied with a negative confidence (that is, "−0.3") which indicates that the word "mild" is not assigned thereto in fact.

FIG. 22 shows an example of a portion of a conversion table designed for the item "year" and used by the bibliographic-information converting block 22. The conversion table in FIG. 22 lists years (input words), and bibliographic-information impression words (output words) assigned to the respective input words, and confidences accompanying the respective output words. In FIG. 22, the bibliographic-information impression word (the output word) "simple" is assigned to the year (the input word) before 1960 and is accompanied with a confidence of "0.8". Furthermore, the bibliographic-information impression word (the output word) "heavy" is virtually assigned to the year (the input word) before 1980 and is accompanied with a negative confidence (that is, "−0.5") which indicates that the word "heavy" is not assigned thereto in fact. In addition, the bibliographic-information impression word (the output word) "sophisticated" is assigned to the year (the input word) after 2000 and is accompanied with a confidence of "0.1".

With reference to FIG. 23, a bibliographic information segment represents that the title, the artist name, the genre, and the year of a corresponding music piece are "Dance 1", "BBB", "punk", and "2001" respectively. According to an example of the word conversion by the bibliographic-information converting block 22 which relates to the items "title", "artist name", and "genre", the input word "Dance 1" in the title is converted into the bibliographic-information impression word (the output word) "upbeat" with a confidence of "0.6". Furthermore, the input word "BBB" in the artist name is converted into the bibliographic-information impression words (the output words) "forceful" and "gentle" with confidences of "0.1" and "−0.3" respectively. In addition, the input word "punk" in the genre is converted into the bibliographic-information impression words (the output words) "upbeat" and "forceful" with confidences of "0.3" and "0.8" respectively.

In FIG. 23, the bibliographic-information impression word "upbeat" corresponds to confidences of "0.6" and "0.3". Thus, for the bibliographic-information impression word "upbeat", the bibliographic-information converting block 22 sums up confidences of "0.6" and "0.3" to compute a confidence total of "0.9". The bibliographic-information impression word "forceful" corresponds to confidences of "0.1" and "0.8". Thus, for the bibliographic-information impression word "forceful", the bibliographic-information converting block 22 sums up confidences of "0.1" and "0.8" to compute a confidence total of "0.9". The bibliographic-information impression word "gentle" corresponds to a confidence of "–0.3". Thus, for the bibliographic-information impression word "gentle", the bibliographic-information converting block 22 uses a confidence of "–0.3" as a confidence total of "–0.3". For the non-hit bibliographic-information impression word "mild", the bibliographic-information converting block 22 sets a confidence total to "0". The bibliographic-information converting block 22 generates a vector (set) of confidence totals of "0.9", "0.9", "–0.3", "0", . . . corresponding to all the bibliographic-information impression words "upbeat", "forceful", "gentle", "mild", . . . respectively. It should be noted that the bibliographic-information converting block 22 may generate a vector (set) of non-zero confidence totals only. The vector generated by the bibliographic-information converting block 22 is referred to as the first impression vector.

The feature-quantity converting block 24 converts the acoustic feature quantities computed by the feature-quantity computing block 23 into a vector (set) of probabilities which corresponds to a set of all feature-quantity impression words. The vector of probabilities is referred to as the second impression vector, and the set of all feature-quantity impression words is called the second set of impression words. The second set of impression words is equal to or different from the first set of impression words. The conversion of the computed acoustic feature quantities into the second impression vector is in a conventional way utilizing Bayes' rule or an artificial neural network.

FIG. 24 shows an example of a portion of the second impression vector generated by the feature-quantity converting block 24. In FIG. 24, the feature-quantity impression words "forceful", "mild", and "upbeat" are assigned probabilities of "0.122", "0.049", and "0.697" respectively. In this case, the feature-quantity converting block 24 generates a vector (set) of probabilities of "0.122", "0.049", "0.697", . . . corresponding to all the feature-quantity impression words "forceful", "mild", "upbeat", respectively.

The impression-word selecting block 25 selects one or ones as a final impression word or words from all the bibliographic-information impression words and all the feature-quantity impression words in response to the first impression vector generated by the bibliographic-information converting block 22 and the second impression vector generated by the feature-quantity converting block 24 for each of the music pieces.

Specifically, the impression-word selecting block 25 decides whether each music piece has a music content or a non-music content on the basis of the genre of the music piece. In the case where the music piece has a non-music content, the impression-word selecting block 25 detects maximum one among the confidence totals in the first impression vector. Then, the impression-word selecting block 25 identifies one among the bibliographic-information impression words which corresponds to the detected maximum confidence total. Subsequently, the impression-word selecting block 25 adopts the identified bibliographic-information impression word as a final impression word. It should be noted that the impression-word selecting block 25 may operate as follows. The impression-word selecting block 25 detects ones among the confidence totals in the first impression vector which are greater than a prescribed reference value. Then, the impression-word selecting block 25 identifies ones among the bibliographic-information impression words which correspond to the detected confidence totals. Subsequently, the impression-word selecting block 25 adopts the identified bibliographic-information impression words as final impression words. Alternatively, the impression-word selecting block 25 may operate as follows. The impression-word selecting block 25 detects a given number of successive greatest ones (the first greatest one, the second greatest one, . . . ) among the confidence totals in the first impression vector. Then, the impression-word selecting block 25 identifies ones among the bibliographic-information impression words which correspond to the detected confidence totals. Subsequently, the impression-word selecting block 25 adopts the identified bibliographic-information impression words as final impression words.

On the other hand, in the case where the music piece has a music content, the impression-word selecting block 25 detects ones among the confidence totals in the first impression vector and the probabilities in the second impression vector which are greater than a prescribed reference value. Then, among the bibliographic-information impression words and the feature-quantity impression words, the impression-word selecting block 25 identifies ones corresponding to the detected confidence totals and probabilities. Subsequently, the impression-word selecting block 25 adopts the identified bibliographic-information impression words and feature-quantity impression words as final impression words. Alternatively, the impression-word selecting block 25 may operate as follows. The impression-word selecting block 25 detects a given number of successive greatest ones (the first greatest one, the second greatest one, . . . ) among the confidence totals in the first impression vector and the probabilities in the second impression vector. Then, among the bibliographic-information impression words and the feature-quantity impression words, the impression-word selecting block 25 identifies ones corresponding to the detected confidence totals and probabilities. Subsequently, the impression-word selecting block 25 adopts the identified bibliographic-information impression words and feature-quantity impression words as final impression words.

FIG. 25 shows an example of a portion of the first impression vector generated by the bibliographic-information converting block 22. The first impression vector in FIG. 25 is of confidence totals "0.7", "0", "0,", "0.2", . . . corresponding to the bibliographic-information impression words "forceful", "mild", "gentle", "upbeat", respectively. FIG. 26 shows an example of a portion of the second impression vector generated by the feature-quantity converting block 24. The second impression vector in FIG. 26 is of probabilities "0.24", "0.04", "0.01", "0.56", corresponding to the feature-quantity impression words "forceful", "mild", "gentle", "upbeat", respectively. In these cases, when the prescribed reference value is equal to "0.5", the bibliographic-information impression word "forceful" corresponding to a confidence total of "0.7" in the first impression vector and the feature-quantity impression word "upbeat" corresponding to a probability of "0.56" in the second impression vector are selected as final impression words. Alternatively, a given number of successive greatest ones (the first greatest one, the second greatest one, . . . ) may be detected among the confidence totals in the first impression vector and the probabilities in the second impression vector. In this case, ones corresponding to the detected confidence totals and probabilities may be identified among the bibliographic-information impression words and the feature-quantity impression words. Subsequently, the identified bibliographic-information impression words and feature-quantity impression words are adopted as final impression words. When the above given number is "2", the bibliographic-information impression word "forceful" corresponding to a confidence total of "0.7" in the first impression vector and the feature-quantity impression word "upbeat"

corresponding to a probability of "0.56" in the second impression vector are adopted as final impression words.

By referring to the first and second impression vectors, the bibliographic-information impression words and the feature-quantity impression words corresponding to confidence totals and probabilities greater than the prescribed reference value are selected as final impression words. Alternatively, the bibliographic-information impression words and the feature-quantity impression words corresponding to the given number of successive greatest ones among the confidence totals and the probabilities may be selected as final impression words. Thereby, music pieces can be accurately classified.

For each of possible pairs of impression words being bibliographic-information impression words and feature-quantity impression words, the degree of conformity between the two in the pair may be predetermined. In this case, the predetermined conformity degrees are collected to form a conformity degree table similar to that in FIG. 12. In the presence of a pair of final impression words, the impression-word selecting block 25 detects the degree of conformity between the original bibliographic-information and/or feature-quantity impression words by referring to the conformity degree table. Then, the impression-word selecting block 25 compares the detected conformity degree with a predetermined threshold value (a conformity-degree threshold value). When the detected conformity degree is greater than the predetermined threshold value, the impression-word selecting block 25 leaves the final impression words as they are. On the other hand, when the detected conformity degree is equal to or smaller than the predetermined threshold value, the impression-word selecting block 25 further compares the confidence total (totals) and/or the probability (probabilities) corresponding to the final impression words. Then, the impression-word selecting block 25 deletes one, which corresponds to the smaller confidence total or probability, from the final impression words.

FIG. 27 shows an example in which final impression words are "forceful" and "upbeat". In this case, the impression-word selecting block 25 detects the degree of conformity between the original impression words "forceful" and "upbeat" by referring to the conformity degree table. According to the example in FIG. 27, the detected conformity degree is equal to "0.9". The impression-word selecting block 25 compares the detected conformity degree with the predetermined threshold value. When the detected conformity degree is greater than the predetermined threshold value, the impression-word selecting block 25 leaves the final impression words as they are. In the case where the predetermined threshold value is equal to "0.5", the detected conformity degree is greater than the predetermined threshold value so that the impression-word selecting block 25 leaves the final impression words "forceful" and "upbeat" as they are. In this case, the music piece is assigned both the final impression words "forceful" and "upbeat". On the other hand, when the detected conformity degree is equal to or smaller than the predetermined threshold value, the impression-word selecting block 25 further compares the confidence total (totals) and/or the probability (probabilities) corresponding to the final impression words. Then, the impression-word selecting block 25 deletes one, which corresponds to the smaller confidence total or probability, from the final impression words. In the case where the predetermined threshold value is equal to "0.95", the detected conformity degree is smaller than the predetermined threshold value so that the impression-word selecting block 25 further compares the confidence total and the probability corresponding to the final impression words "forceful" and "upbeat". The confidence total corresponding to the final impression word "forceful" is equal to "0.7" while the probability corresponding to the final impression word "upbeat" is equal to "0.56". Therefore, the impression-word selecting block 25 deletes "upbeat" from the final impression words. In this way, the number of the final impression words is reduced. The reduction in the number of the final impression words enhances the accuracy of the music-piece classification.

Figure 28:
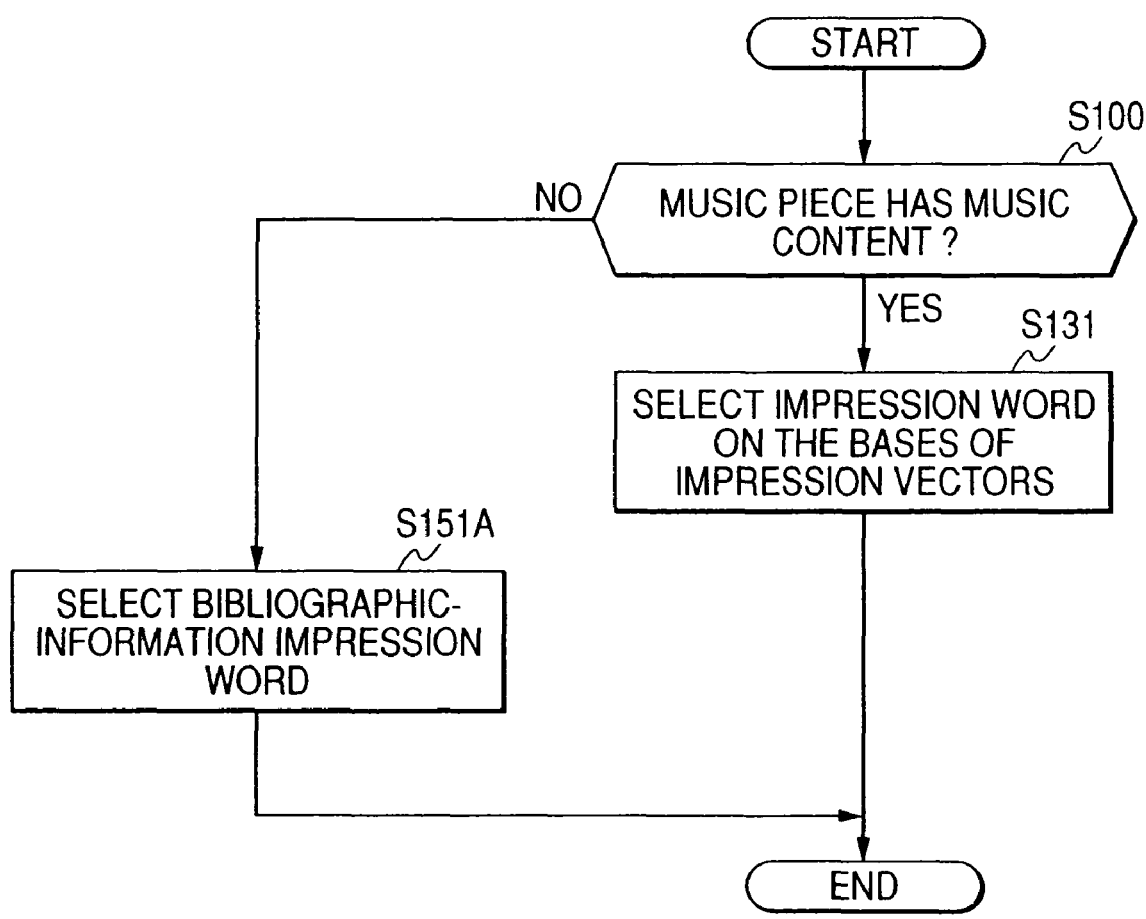
FIG. 28 is a flowchart of a segment of a control program for a music-piece classifying apparatus in the second embodiment of this invention.

FIG. 28 is a flowchart of a segment of a control program for the music-piece classifying apparatus 1 which relates to the impression-word selection. The program segment in FIG. 28 is executed for each of music pieces which have not been assigned final impression words yet.

As shown in FIG. 28, a first step S100 of the program segment detects the genre of the music piece from the bibliographic information segment thereabout. The step S100 decides whether the music piece has a music content or a non-music content on the basis of the detected genre thereof. When the music piece has a non-music content, the program advances from the step S100 to a step S151A. When the music piece has a music content, the program advances from the step S100 to a step S131.

The step S151A detects maximum one among the confidence totals in the first impression vector. Then, the step S151A identifies one among the bibliographic-information impression words which corresponds to the detected maximum confidence total. Subsequently, the step S151A adopts the identified bibliographic-information impression word as a final impression word. It should be noted that the step S151A may operate as follows. The step S151A detects ones among the confidence totals in the first impression vector which are greater than a prescribed reference value. Then, the step S151A identifies ones among the bibliographic-information impression words which correspond to the detected confidence totals. Subsequently, the step S151A adopts the identified bibliographic-information impression words as final impression words. Alternatively, the step S151A may operate as follows. The step S151A detects a given number of successive greatest ones (the first greatest one, the second greatest one, . . . ) among the confidence totals in the first impression vector. Then, the step S151A identifies ones among the bibliographic-information impression words which correspond to the detected confidence totals. Subsequently, the step S151A adopts the identified bibliographic-information impression words as final impression words. After the step S151A, the current execution cycle of the program segment ends.

The step S131 detects ones among the confidence totals in the first impression vector and the probabilities in the second impression vector which are greater than a prescribed reference value. Then, among the bibliographic-information impression words and the feature-quantity impression words, the step S131 identifies ones corresponding to the detected confidence totals and probabilities. Subsequently, the step S131 adopts the identified bibliographic-information impression words and feature-quantity impression words as final impression words. Alternatively, the step S131 may operate as follows. The step S131 detects a given number of successive greatest ones (the first greatest one, the second greatest one, . . . ) among the confidence totals in the first impression vector and the probabilities in the second impression vector. Then, among the bibliographic-information impression words and the feature-quantity impression words, the step S131 identifies ones corresponding to the detected confidence totals and probabilities. Subsequently, the step S131 adopts the identified bibliographic-information impression words and feature-quantity impression words as final impression words. After the step S131, the current execution cycle of the program segment ends.

As previously mentioned, the conversion table or tables for converting a bibliographic information segment into a bibliographic-information impression word or words include predetermined confidences. Therefore, a final impression word or words can be precisely selected, and the accuracy of the music-piece classification can be enhanced.

Third Embodiment

A third embodiment of this invention is similar to the second embodiment thereof except for design changes mentioned hereafter. In the third embodiment of this invention, the second set of impression words, that is, the set of all feature-quantity impression words, is equal to the first set of impression words (the set of all bibliographic-information impression words listed in the conversion table or tables). Thus, the feature-quantity impression words are the same as the bibliographic-information impression words. The feature-quantity impression words are referred to as the basic impression words, and the bibliographic-information impression words are also called the basic impression words.

According to the third embodiment of this invention, the impression-word selecting block 25 operates regarding each of music pieces which have not been assigned final impression words yet. Specifically, the impression-word selecting block 25 detects the genre of the music piece from the bibliographic information segment thereabout. The impression-word selecting block 25 decides whether the music piece has a music content or a non-music content on the basis of the detected genre thereof. In the case where the music piece has a non-music content, the impression-word selecting block 25 detects maximum one among the confidence totals in the first impression vector. Then, the impression-word selecting block 25 identifies one among the basic impression words which corresponds to the detected maximum confidence total. Subsequently, the impression-word selecting block 25 adopts the identified impression word as a final impression word. It should be noted that the impression-word selecting block 25 may operate as follows. The impression-word selecting block 25 detects ones among the confidence totals in the first impression vector which are greater than a prescribed reference value. Then, the impression-word selecting block 25 identifies ones among the basic impression words which correspond to the detected confidence totals. Subsequently, the impression-word selecting block 25 adopts the identified impression words as final impression words. Alternatively, the impression-word selecting block 25 may operate as follows. The impression-word selecting block 25 detects a given number of successive greatest ones (the first greatest one, the second greatest one, . . . ) among the confidence totals in the first impression vector. Then, the impression-word selecting block 25 identifies ones among the basic impression words which correspond to the detected confidence totals. Subsequently, the impression-word selecting block 25 adopts the identified impression words as final impression words. There may be only one final impression word. In this way, the music piece is assigned the final impression word or words.

On the other hand, in the case where the music piece has a music content, the impression-word selecting block 25 adds the confidence total in the first impression vector and the probability in the second impression vector to get a combination value for each of the basic impression words. Thus, the impression-word selecting block 25 obtains a vector of the computed combination values for the respective basic impression words. The obtained vector is referred to as the combination impression vector.

FIG. 29 shows an example of some of the basic impression words and portions of the first impression vector, the second impression vector, and the combination impression vector. In FIG. 29, the basic impression word "forceful" corresponds to a confidence total of "0.2" in the first impression vector and a probability of "0.22" in the second impression vector. Values of "0.2" and "0.22" are added to get a combination value of "0.42". Accordingly, the basic impression word "forceful" corresponds to a combination value of "0.42" in the combination impression vector. In FIG. 29, the basic impression word "mild" corresponds to a confidence total of "0.6" in the first impression vector and a probability of "0.3" in the second impression vector. Values of "0.6" and "0.3" are added to get a combination value of "0.9". Accordingly, the basic impression word "mild" corresponds to a combination value of "0.9" in the combination impression vector. In FIG. 29, the basic impression word "upbeat" corresponds to a confidence total of "0.2" in the first impression vector and a probability of "0.25" in the second impression vector. Values of "0.2" and "0.25" are added to get a combination value of "0.45". Accordingly, the basic impression word "upbeat" corresponds to a combination value of "0.45" in the combination impression vector. In FIG. 29, the basic impression word "simple" corresponds to a confidence total of "−0.3" in the first impression vector and a probability of "0.1" in the second impression vector. Values of "−0.3" and "0.1" are added to get a combination value of "−0.2". Accordingly, the basic impression word "simple" corresponds to a combination value of "−0.2" in the combination impression vector.

The impression-word selecting block 25 detects ones among the combination values in the combination impression vector which are greater than a prescribed reference value. Then, among the basic impression words, the impression-word selecting block 25 identifies ones corresponding to the detected combination values. Subsequently, the impression-word selecting block 25 adopts the identified impression words as final impression words. Alternatively, the impression-word selecting block 25 may operate as follows. The impression-word selecting block 25 detects a given number of successive greatest ones (the first greatest one, the second greatest one, . . . ) among the combination values in the combination impression vector. Then, among the basic impression words, the impression-word selecting block 25 identifies ones corresponding to the detected combination values. Subsequently, the impression-word selecting block 25 adopts the identified impression words as final impression words. There may be only one final impression word. In this way, the music piece is assigned the final impression word or words.

According to the example in FIG. 29, when the prescribed reference value is equal to "0.5", only the basic impression word "mild" which corresponds to a combination value of "0.9" is selected as a final impression word. When the prescribed reference value is equal to "0.4", the basic impression words "forceful", "mild", and "upbeat" which correspond to combination values of "0.42", "0.9", and "0.45" are selected as final impression words. In the case where the above given number of successive greatest ones is equal to "3", the basic impression words "mild", "upbeat", and "forceful" which correspond to combination values of "0.9", "0.45", and "0.42" are selected as final impression words.

By referring to the combination impression vector, the basic impression words greater than the prescribed reference value are selected as final impression words. Alternatively, the basic impression words corresponding to the given number of successive greatest ones among the combination values may be selected as final impression words. Thereby, music pieces can be accurately classified.

For each of possible pairs of basic impression words, the degree of conformity between the two in the pair may be predetermined. In this case, the predetermined conformity degrees are collected to form a conformity degree table similar to that in FIG. 12. In the presence of a pair of final impression words, the impression-word selecting block 25 detects the degree of conformity between the basic impression words selected as the final impression words by referring to the conformity degree table. Then, the impression-word selecting block 25 compares the detected conformity degree with a predetermined threshold value (a conformity-degree threshold value). When the detected conformity degree is greater than the predetermined threshold value, the impression-word selecting block 25 leaves the final impression words as they are. On the other hand, when the detected conformity degree is equal to or smaller than the predetermined threshold value, the impression-word selecting block 25 further compares the combination values corresponding to the final impression words. Then, the impression-word selecting block 25 deletes one, which corresponds to the smaller combination value, from the final impression words.

FIG. 30 shows an example in which the final impression words are "forceful", "mild", and "upbeat", and the conformity degrees for the pair "forceful" and "mild", the pair "upbeat" and "forceful", and the pair "mild" and "upbeat" are equal to "0.1", "0.9", and "0.6" respectively. FIG. 31 shows an example in which the combination values corresponding to the final impression words "forceful", "mild", and "upbeat" are equal to "0.42", "0.9", and "0.45" respectively. In these cases, when the predetermined threshold value is equal to "0.5", the pair "forceful" and "mild" corresponds to a conformity degree of "0.1" smaller than the predetermined threshold value. Therefore, the combination values corresponding to "forceful" and "mild" are compared. The combination value for "forceful" is equal to "0.42" while that for "mild" is equal to "0.9". Thus, "mild" is left as a final impression word, and "forceful" is deleted therefrom. The pairs each having "upbeat" correspond to conformity degrees of "0.9" and "0.6" greater than the predetermined threshold value. Accordingly, "upbeat" is left as a final impression word. As a result, the music piece is assigned the final impression words "mild" and "upbeat". In this way, the number of the final impression words is reduced. The reduction in the number of the final impression words enhances the accuracy of the music-piece classification.

Figure 32:
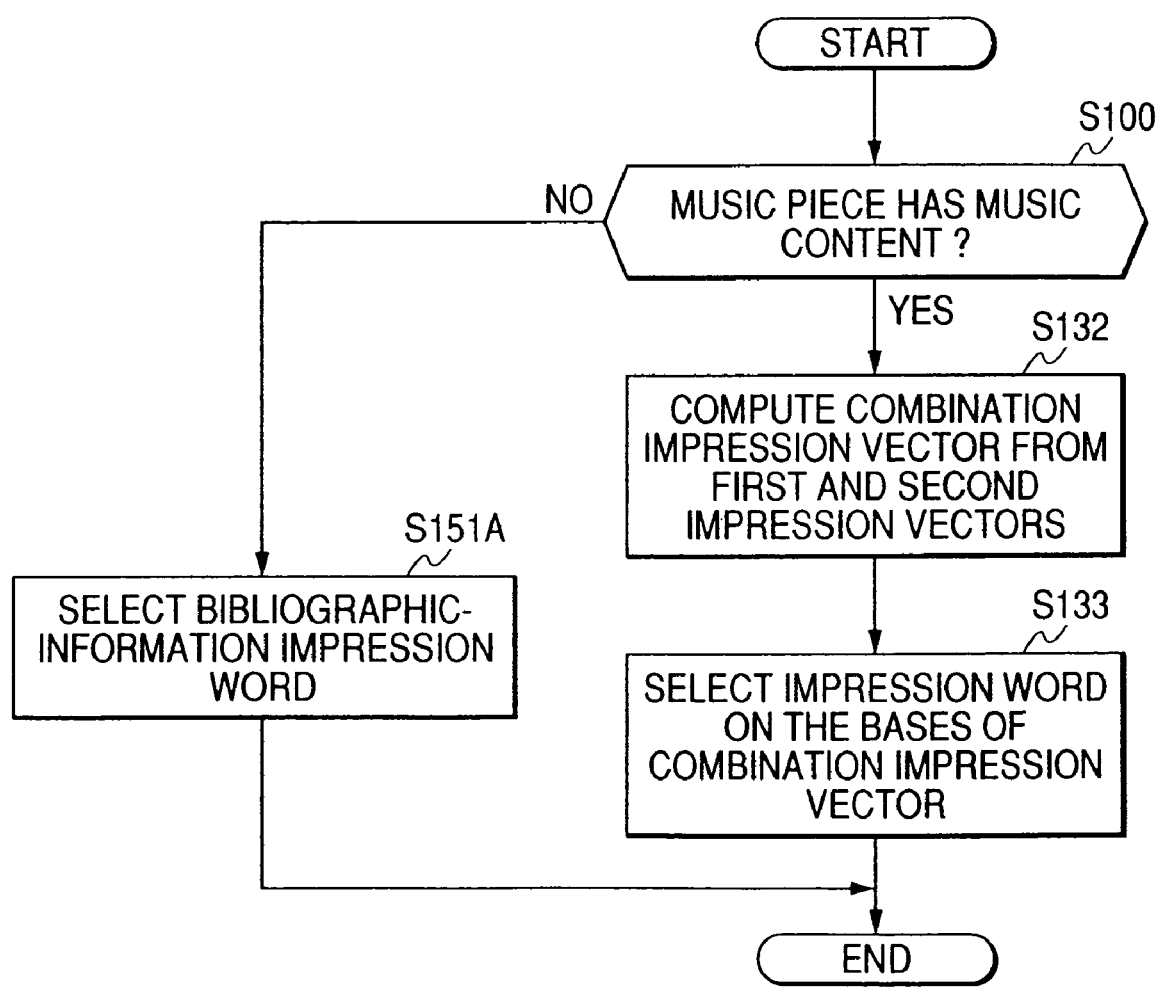
FIG. 32 is a flowchart of a segment of a control program for a music-piece classifying apparatus in the third embodiment of this invention.

FIG. 32 is a flowchart of a segment of a control program for the music-piece classifying apparatus 1 which relates to the impression-word selection. The program segment in FIG. 32 is executed for each of music pieces which have not been assigned final impression words yet.

As shown in FIG. 32, a first step S100 of the program segment detects the genre of the music piece from the bibliographic information segment thereabout. The step S100 decides whether the music piece has a music content or a non-music content on the basis of the detected genre thereof. When the music piece has a non-music content, the program advances from the step S100 to a step S151A. When the music piece has a music content, the program advances from the step S100 to a step S132.

The step S151A is the same as that in FIG. 28. After the step S151A, the current execution cycle of the program segment ends.

The step S132 adds the confidence total in the first impression vector and the probability in the second impression vector to get a combination value for each of the basic impression words. Thus, the step S132 obtains a vector of the computed combination values for the respective basic impression words, that is, a combination impression vector.

A step S133 following the step S132 detects ones among the combination values in the combination impression vector which are greater than the prescribed reference value. Then, among the basic impression words, the step S133 identifies ones corresponding to the detected combination values. Subsequently, the step S133 adopts the identified impression words as final impression words. Alternatively, the step S133 may operate as follows. The step S133 detects a given number of successive greatest ones (the first greatest one, the second greatest one, . . . ) among the combination values in the combination impression vector. Then, among the basic impression words, the step S133 identifies ones corresponding to the detected combination values. Subsequently, the step S133 adopts the identified impression words as final impression words. There may be only one final impression word. After the step S133, the current execution cycle of the program segment ends.

As understood from the above description, the first impression vector and the second impression vector are combined into the combination impression vector. The assignment of an impression word or words to each music piece can be precisely performed through the use of the combination impression table. Therefore, each music piece can be assigned an impression word or words in good harmony with user's feelings.

What is claimed is:

1. A music-piece classifying apparatus comprising:
   means for generating bibliographic-information impression words on the basis of bibliographic information segments about music pieces;
   means for generating feature-quantity impression words on the basis of acoustic feature quantities of audio signals representing the music pieces;
   means for determining a degree of conformity between the bibliographic-information impression word and the feature-quantity impression word for each of the music pieces;
   means for selecting both the bibliographic-information impression word and the feature-quantity impression word as final impression words when the determined degree is greater than a predetermined threshold value for each of the music pieces;
   means for selecting either the bibliographic-information impression word or the feature-quantity impression word as a final impression word when the determined degree is not greater than the predetermined threshold value for each of the music pieces; and
   means for classifying the music pieces according to the final impression words.

2. A music-piece classifying apparatus comprising:
   means for generating bibliographic-information impression words on the basis of bibliographic information segments about music pieces;
   means for generating feature-quantity impression words on the basis of acoustic feature quantities of audio signals representing the music pieces;
   means for deriving confidences corresponding to the respective bibliographic-information impression words;

means for deriving probabilities corresponding to the respective feature-quantity impression words;

means for adding the derived confidences and the derived probabilities to get addition-result values for respective combinations of the bibliographic-information impression words and the feature-quantity impression words or ranking the bibliographic-information impression words and the feature-quantity impression words according to the derived confidences and the derived probabilities;

means for selecting the bibliographic-information impression word and the feature-quantity impression word in a combination greatest in addition-result value as final impression words, or selecting, from the bibliographic-information impression words and the feature-quantity impression words, a prescribed number of ones higher in rank as final impression words, or selecting the bibliographic-information impression words and the feature-quantity impression words in combinations corresponding to addition-result values greater than a prescribed value as final impression words; and means for classifying the music pieces according to the final impression words.

3. A music-piece classifying apparatus comprising:

means for generating positively-assigned and negatively-assigned candidate impression words on the basis of bibliographic information segments about music pieces;

means for selecting, from the candidate impression words, ones not canceled by the negatively-assigned candidate impression words as bibliographic-information impression words;

means for generating feature-quantity impression words on the basis of acoustic feature quantities of audio signals representing the music pieces;

means for selecting ones from the bibliographic-information impression words and the feature-quantity impression words as final impression words assigned to the respective music pieces through a prescribed deciding process; and means for classifying the music pieces according to the final impression words.

* * * * *